United States Patent
Walker et al.

(10) Patent No.: US 9,235,954 B2
(45) Date of Patent: *Jan. 12, 2016

(54) GAMING SYSTEM AND METHOD FOR PROVIDING AND REDEEMING PARTIAL WAGERING GAME OUTCOMES

(71) Applicant: IGT, Las Vegas, NV (US)

(72) Inventors: Jay S. Walker, Ridgefield, CT (US); James A. Jorasch, New York, NY (US); Robert C. Tedesco, Fairfield, CT (US); Daniel E. Tedesco, Huntington, CT (US); Jeffrey Y. Hayashida, San Francisco, CA (US); Russell P. Sammon, San Francisco, CA (US); Stephen C. Tulley, Fairfield, CT (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/637,140

(22) Filed: Mar. 3, 2015

(65) Prior Publication Data

US 2015/0179020 A1 Jun. 25, 2015

Related U.S. Application Data

(63) Continuation of application No. 14/031,652, filed on Sep. 19, 2013, now Pat. No. 8,992,302, which is a continuation of application No. 13/533,799, filed on Jun. 26, 2012, now Pat. No. 8,545,308, which is a continuation of application No. 12/307,705, filed as application No. PCT/US2007/079550 on Sep. 26, 2007, now Pat. No. 8,221,215.

(60) Provisional application No. 60/826,958, filed on Sep. 26, 2006.

(51) Int. Cl.
G07F 17/32 (2006.01)
A63F 13/30 (2014.01)

(52) U.S. Cl.
CPC ............ *G07F 17/3225* (2013.01); *A63F 13/12* (2013.01); *G07F 17/3223* (2013.01); *G07F 17/3244* (2013.01)

(58) Field of Classification Search
None
See application file for complete search history.

(56) References Cited

U.S. PATENT DOCUMENTS 2,205,471 A 6/1940 Fagerholm
2,474,573 A 6/1949 Cohen (Continued)

FOREIGN PATENT DOCUMENTS

DE 27 24 153 8/1978
GB 2 098 778 11/1985

(Continued)

*Primary Examiner* — Sunit Pandya
(74) *Attorney, Agent, or Firm* — Neal, Gerber & Eisenberg LLP

(57) ABSTRACT

Methods, computer readable media and systems related to wagering games, and in particular those that concern providing and redeeming partial game outcomes. One example method includes receiving a completion request from a player who is operating a gaming device to complete at least one partial game outcome. The partial game outcome was previously provided to the player, who used a first device that is different than the gaming device. This example method includes determining that the player is entitled to a complete game outcome, displaying the partial game outcome on the gaming device, determining the complete game outcome, and then displaying the complete game outcome.

20 Claims, 13 Drawing Sheets

(56) References Cited

U.S. PATENT DOCUMENTS

| | | |
|---|---|---|
| 2,743,108 A | 4/1956 | Sanders |
| 2,812,182 A | 11/1957 | Fiorino |
| 2,842,368 A | 7/1958 | Williams |
| 3,505,646 A | 4/1970 | Affel, Jr. et al. |
| 3,549,150 A | 12/1970 | Weeks |
| 3,655,199 A | 4/1972 | Ohki |
| D228,142 S | 8/1973 | Mannina |
| 3,843,133 A | 10/1974 | Brown |
| 4,015,850 A | 4/1977 | Russell |
| 4,033,588 A | 7/1977 | Watts |
| 4,066,264 A | 1/1978 | Rowman |
| 4,093,215 A | 6/1978 | Ballard |
| 4,126,851 A | 11/1978 | Okor |
| 4,149,727 A | 4/1979 | Penney |
| 4,193,598 A | 3/1980 | Freese |
| 4,218,063 A | 8/1980 | Cooper et al. |
| 4,247,106 A | 1/1981 | Jeffers et al. |
| 4,322,612 A | 3/1982 | Lange |
| 4,335,809 A | 6/1982 | Wain |
| 4,339,798 A | 7/1982 | Hedges et al. |
| 4,359,227 A | 11/1982 | Porciello |
| 4,372,558 A | 2/1983 | Shimamoto et al. |
| 4,389,048 A | 6/1983 | Burgess |
| 4,443,012 A | 4/1984 | Makovic et al. |
| 4,467,424 A | 8/1984 | Hedges et al. |
| 4,494,197 A | 1/1985 | Troy et al. |
| 4,506,890 A | 3/1985 | Murry |
| 4,517,656 A | 5/1985 | Solimeno et al. |
| 4,564,923 A | 1/1986 | Nakano |
| 4,570,930 A | 2/1986 | Matheson |
| 4,572,509 A | 2/1986 | Sitrick |
| 4,573,681 A | 3/1986 | Okada |
| 4,614,342 A | 9/1986 | Takashima |
| 4,636,174 A | 1/1987 | Anderson et al. |
| 4,648,602 A | 3/1987 | Maroney |
| 4,657,256 A | 4/1987 | Okada |
| 4,695,053 A | 9/1987 | Vazquez, Jr. et al. |
| 4,720,108 A | 1/1988 | Gramera |
| 4,752,068 A | 6/1988 | Endo |
| 4,760,527 A | 7/1988 | Sidley |
| 4,834,386 A | 5/1989 | Rosenthal et al. |
| 4,836,553 A | 6/1989 | Suttle et al. |
| 4,837,728 A | 6/1989 | Barrie et al. |
| 4,861,041 A | 8/1989 | Jones et al. |
| 4,961,581 A | 10/1990 | Barnes et al. |
| 4,986,546 A | 1/1991 | Cerulla |
| 4,995,615 A | 2/1991 | Cheng |
| 5,031,914 A | 7/1991 | Rosenthal |
| 5,043,889 A | 8/1991 | Lucey |
| 5,074,559 A | 12/1991 | Okada |
| 5,102,134 A | 4/1992 | Smyth |
| 5,112,050 A | 5/1992 | Koza et al. |
| 5,129,652 A | 7/1992 | Wilkinson |
| 5,193,815 A | 3/1993 | Pollard |
| 5,221,083 A | 6/1993 | Dote |
| 5,290,033 A | 3/1994 | Bittner et al. |
| 5,301,952 A | 4/1994 | Fitzgerald |
| 5,324,041 A | 6/1994 | Boylan et al. |
| 5,356,140 A | 10/1994 | Dabrowski et al. |
| 5,374,060 A | 12/1994 | Goldberg |
| 5,380,008 A | 1/1995 | Mathis et al. |
| 5,393,067 A | 2/1995 | Paulsen et al. |
| 5,401,024 A | 3/1995 | Simunek |
| 5,411,260 A | 5/1995 | Smith |
| 5,417,424 A | 5/1995 | Snowden et al. |
| 5,462,277 A | 10/1995 | Takemoto |
| 5,472,195 A | 12/1995 | Takemoto et al. |
| 5,482,289 A | 1/1996 | Weingardt |
| 5,489,096 A | 2/1996 | Aron |
| 5,560,610 A | 10/1996 | Behm et al. |
| 5,564,977 A | 10/1996 | Algie |
| 5,613,679 A | 3/1997 | Casa et al. |
| 5,624,119 A | 4/1997 | Leake |
| 5,649,704 A | 7/1997 | Dobbin |
| 5,669,817 A | 9/1997 | Tarantino |
| 5,697,843 A | 12/1997 | Manship et al. |
| 5,704,835 A | 1/1998 | Dietz, II |
| 5,727,786 A | 3/1998 | Weingardt |
| 5,732,948 A | 3/1998 | Yoseloff |
| 5,768,382 A | 6/1998 | Schneier et al. |
| 5,772,509 A | 6/1998 | Weiss |
| 5,772,510 A | 6/1998 | Roberts |
| 5,788,240 A | 8/1998 | Feinberg |
| 5,803,451 A | 9/1998 | Kelly et al. |
| 5,816,915 A | 10/1998 | Kadlic |
| 5,816,918 A | 10/1998 | Kelly et al. |
| 5,823,874 A | 10/1998 | Adams |
| 5,823,875 A | 10/1998 | Tarantino |
| 5,833,537 A | 11/1998 | Barrie |
| 5,833,538 A | 11/1998 | Weiss |
| 5,839,960 A | 11/1998 | Parra et al. |
| 5,848,932 A | 12/1998 | Adams |
| 5,868,618 A | 2/1999 | Netley et al. |
| 5,885,157 A | 3/1999 | Harada et al. |
| 5,890,963 A | 4/1999 | Yen |
| 5,909,875 A | 6/1999 | Weingardt |
| 5,938,196 A | 8/1999 | Antoja |
| 5,964,463 A | 10/1999 | Moore, Jr. |
| 5,984,779 A | 11/1999 | Bridgeman et al. |
| 5,988,638 A | 11/1999 | Rodesch et al. |
| 6,024,641 A | 2/2000 | Sarno |
| 6,062,979 A | 5/2000 | Inoue |
| 6,068,552 A | 5/2000 | Walker et al. |
| 6,089,977 A | 7/2000 | Bennett |
| 6,102,400 A | 8/2000 | Scott et al. |
| 6,113,492 A | 9/2000 | Walker et al. |
| 6,120,377 A | 9/2000 | McGinnis, Sr. et al. |
| 6,120,378 A | 9/2000 | Moody et al. |
| 6,123,333 A | 9/2000 | McGinnis, Sr. et al. |
| 6,176,781 B1 | 1/2001 | Walker et al. |
| 6,183,361 B1 | 2/2001 | Cummings et al. |
| 6,213,876 B1 | 4/2001 | Moore, Jr. |
| 6,270,411 B1 | 8/2001 | Gur et al. |
| 6,286,834 B1 | 9/2001 | Caputo |
| 6,305,686 B1 | 10/2001 | Perrie et al. |
| 6,315,291 B1 | 11/2001 | Moody |
| 6,334,814 B1 | 1/2002 | Adams |
| 6,346,043 B1 | 2/2002 | Colin et al. |
| 6,364,313 B1 | 4/2002 | Moody |
| 6,368,212 B1 | 4/2002 | Moody |
| 6,368,214 B1 | 4/2002 | Luciano |
| 6,443,837 B1 | 9/2002 | Jaffe et al. |
| 6,471,208 B2 | 10/2002 | Yoseloff et al. |
| 6,554,703 B1 | 4/2003 | Bussick et al. |
| 6,585,588 B2 | 7/2003 | Hartl |
| 6,592,457 B1 | 7/2003 | Frohm et al. |
| 6,669,559 B1 | 12/2003 | Baerlocher et al. |
| 6,800,027 B2 | 10/2004 | Giobbi et al. |
| 6,877,745 B1 | 4/2005 | Walker et al. |
| 7,056,213 B2 | 6/2006 | Ching et al. |
| 7,182,690 B2 | 2/2007 | Giobbi et al. |
| 7,393,278 B2 | 7/2008 | Gerson et al. |
| 2002/0193099 A1 | 12/2002 | Paulsen |
| 2006/0058092 A1 | 3/2006 | Crawford et al. |
| 2006/0287044 A1 | 12/2006 | Duhamel |
| 2007/0060254 A1 | 3/2007 | Muir |
| 2007/0178972 A1 | 8/2007 | Moshal |
| 2008/0090650 A1 | 4/2008 | Tarantino |
| 2009/0104968 A1 | 4/2009 | Englman et al. |
| 2009/0305765 A1 | 12/2009 | Walker et al. |

FOREIGN PATENT DOCUMENTS

| | | |
|---|---|---|
| GB | 2 190 227 | 11/1987 |
| GB | 2 205 188 | 11/1988 |
| GB | 2 253 299 | 9/1992 |
| WO | WO0103786 | 1/2001 |
| WO | WO03027970 | 4/2003 |

| RANDOM NUMBER(S) 342 | PARTIAL OUTCOME 344 | PARTIAL OUTCOME IDENTIFIER 346 |
|---|---|---|
| 1-5 | JACKPOT-JACKPOT-? | PO-000001 |
| 6-15 | BAR-BAR-? | PO-000002 |
| 16-40 | BAR-BAR-? | PO-000002 |
| 41-90 | BAR-BAR-? | PO-000002 |
| 91-165 | BELL-BELL-? | PO-000003 |
| 166-265 | BELL-BELL-? | PO-000003 |
| 266-765 | BELL-BELL-? | PO-000003 |
| 766-1515 | CHERRY-CHERRY-? | PO-000004 |
| 1516-6515 | CHERRY-CHERRY-? | PO-000004 |
| 6516-100000 | PARTIAL NON-WIN | PO-00000N |

FIG. 3C

| RANDOM NUMBER(S) 372 | COMPLETE OUTCOME 374 | PARTIAL OUTCOME 376 | PARTIAL OUTCOME IDENTIFIER 378 |
|---|---|---|---|
| 1-5 | JACKPOT-JACKPOT-JACKPOT | JACKPOT-JACKPOT-? | PO-000001 |
| 6-15 | BAR-BAR-BAR | BAR-BAR-? | PO-000002 |
| 16-40 | BAR-BAR-CHERRY | BAR-BAR-? | PO-000003 |
| 41-90 | BAR-BAR-7 | BAR-BAR-? | PO-000004 |
| 91-165 | BELL-BELL-BELL | BELL-BELL-? | PO-000005 |
| 166-265 | BELL-BELL-CHERRY | BELL-BELL-? | PO-000006 |
| 266-765 | BELL-BELL-7 | BELL-BELL-? | PO-000007 |
| 766-1515 | CHERRY-CHERRY-CHERRY | CHERRY-CHERRY-? | PO-000008 |
| 1516-6515 | CHERRY-CHERRY-BAR | CHERRY-CHERRY-? | PO-000009 |
| 6516-100000 | NON-WINNING COMBINATION | PARTIAL NON-WIN | PO-00000N |

FIG. 3E

GAMING DEVICE: GD-000001 (BIG JACKPOT SLOT MACHINE) 405

STANDARD PLAY PAYTABLE: PT-000001  410

| RANDOM NUMBER(S) 415 | OUTCOME ID 420 | COMPLETE OUTCOME 425 | PROBABILITY OF COMP. OUTCOME 430 | PAYOUT 435 | EV 440 |
|---|---|---|---|---|---|
| 1-5 | O-000001 | JACKPOT-JACKPOT-JACKPOT | 0.00005 | 1000 | 0.05 |
| 6-15 | O-000002 | BAR-BAR-BAR | 0.0001 | 500 | 0.05 |
| 16-40 | O-000003 | BAR-BAR-CHERRY | 0.00025 | 250 | 0.0625 |
| 41-90 | O-000004 | BAR-BAR-7 | 0.0005 | 150 | 0.075 |
| 91-165 | O-000005 | BELL-BELL-BELL | 0.00075 | 100 | 0.075 |
| 166-265 | O-000006 | BELL-BELL-CHERRY | 0.001 | 50 | 0.05 |
| 266-765 | O-000007 | BELL-BELL-7 | 0.005 | 40 | 0.02 |
| 766-1515 | O-000008 | CHERRY-CHERRY-CHERRY | 0.0075 | 20 | 0.15 |
| 1516-6515 | O-000009 | CHERRY-CHERRY-BAR | 0.05 | 5 | 0.25 |
| 6516-100000 | O-0000N | NON-WINNING COMBINATION | 0.93485 | 0 | 0 |
|  |  |  |  |  | 0.9625 |

PARTIAL OUTCOME PAYTABLE: PT-000002  450

| RANDOM NUMBER(S) 455 | PARTIAL OUTCOME 460 | PARTIAL OUTCOME ID 465 | COMPLETION PAYTABLE 470 |
|---|---|---|---|
| 1-5 | JACKPOT-JACKPOT-? | PO-000001 | PT-000003 |
| 6-15 | BAR-BAR-? | PO-000002 | PT-000004 |
| 16-40 | BAR-BAR-? | PO-000002 | PT-000004 |
| 41-90 | BAR-BAR-? | PO-000002 | PT-000004 |
| 91-165 | BELL-BELL-? | PO-000003 | PT-000005 |
| 166-265 | BELL-BELL-? | PO-000003 | PT-000005 |
| 266-765 | BELL-BELL-? | PO-000003 | PT-000005 |
| 766-1515 | CHERRY-CHERRY-? | PO-000004 | PT-000006 |
| 1516-6515 | CHERRY-CHERRY-? | PO-000004 | PT-000006 |
| 6516-100000 | PARTIAL NON-WIN | PO-00000N | PT-00000N |

FIG. 4

| PARTIAL RESULTS ACHIEVED DATABASE | | | | 500 |
|---|---|---|---|---|
| PLAYER ID: P-092983 | | | | 505 |
| PARTIAL RESULTS SESSION ID: PRS-009291 | | | | 510 |
| EXPIRATION DATE: 1.1.07 | | | | 515 |
| PARTIAL RESULT NUMBER 520 | PARTIAL RESULT 525 | PARTIAL RESULT ID 530 | COMPLETION PAYTABLE 535 | COMPLETED? 540 |
| 1 | PARTIAL NON-WIN | PO-00000N | PT-00000N | N |
| 2 | PARTIAL NON-WIN | PO-00000N | PT-00000N | N |
| 3 | BELL-BELL-? | PO-000003 | PT-000005 | N |
| 4 | PARTIAL NON-WIN | PO-00000N | PT-00000N | N |
| 5 | PARTIAL NON-WIN | PO-00000N | PT-00000N | N |
| 6 | CHERRY-CHERRY-? | PO-000004 | PT-000006 | N |
| 7 | JACKPOT-JACKPOT-? | PO-000001 | PT-000003 | N |
| 8 | PARTIAL NON-WIN | PO-00000N | PT-00000N | N |
| 9 | PARTIAL NON-WIN | PO-00000N | PT-00000N | N |
| 10 | BAR-BAR-? | PO-000002 | PT-000004 | N |

| GAMING DEVICE: GD-000001 (BIG JACKPOT SLOT MACHINE) | | | | 642 |
|---|---|---|---|---|
| BELL-BELL COMPLETION PAYTABLE: PT-000005 | | | | 644 |
| OUTCOME ID 646 | COMPLETE OUTCOME 648 | PROBABILITY 650 | PAYOUT 652 | EV 654 |
| O-000005 | BELL-BELL-BELL | 0.001 | 100 | 0.1 |
| O-000006 | BELL-BELL-CHERRY | 0.005 | 50 | 0.25 |
| O-000007 | BELL-BELL-7 | 0.0153125 | 40 | 0.6125 |
| O-0000019 | BELL-BELL-BAR | 0.326229167 | 0 | 0 |
| O-0000020 | BELL-BELL-PLUM | 0.326229167 | 0 | 0 |
| O-0000021 | BELL-BELL-BLANK | 0.326229167 | 0 | 0 |
| | | | 656 | 0.9625 |

| GAMING DEVICE: GD-000001 (BIG JACKPOT SLOT MACHINE) | | | | 662 |
|---|---|---|---|---|
| CHERRY-CHERRY COMPLETION PAYTABLE: PT-000006 | | | | 664 |
| OUTCOME ID 666 | COMPLETE OUTCOME 668 | PROBABILITY 670 | PAYOUT 672 | EV 674 |
| O-000008 | CHERRY-CHERRY-CHERRY | 0.00075 | 20 | 0.015 |
| O-000009 | CHERRY-CHERRY-BAR | 0.1895 | 5 | 0.9475 |
| O-0000022 | CHERRY-CHERRY-7 | 0.2024375 | 0 | 0 |
| O-0000023 | CHERRY-CHERRY-BELL | 0.2024375 | 0 | 0 |
| O-0000024 | CHERRY-CHERRY-PLUM | 0.2024375 | 0 | 0 |
| O-0000025 | CHERRY-CHERRY-BLANK | 0.2024375 | 0 | 0 |
| | | | 676 | 0.9625 |

FIG. 6D

| GAMING DEVICE: GD-000002 ("WIN FROM HOME" SLOT MACHINE) | | | | 705 |
| --- | --- | --- | --- | --- |
| JACKPOT-JACKPOT COMPLETION PAYTABLE: PT2-000003 | | | | 710 |
| OUTCOME ID 715 | COMPLETE OUTCOME 720 | PROBABILITY 725 | PAYOUT 730 | EV 735 |
| O-000001 | JACKPOT-JACKPOT-JACKPOT | 0.00125 | 1000 | 1.25 |
| O-0000010 | JACKPOT-JACKPOT-BAR | 0.166458333 | 0 | 0 |
| O-0000011 | JACKPOT-JACKPOT-BELL | 0.166458333 | 0 | 0 |
| O-0000012 | JACKPOT-JACKPOT-CHERRY | 0.166458333 | 0 | 0 |
| O-0000013 | JACKPOT-JACKPOT-7 | 0.166458333 | 0 | 0 |
| O-0000014 | JACKPOT-JACKPOT-PLUM | 0.166458333 | 0 | 0 |
| O-0000015 | JACKPOT-JACKPOT-BLANK | 0.166458333 | 0 | 0 |
| | | | 740 | 1.25 |

FIG. 7

GAMING SYSTEM AND METHOD FOR PROVIDING AND REDEEMING PARTIAL WAGERING GAME OUTCOMES

PRIORITY CLAIM

This application is a continuation of, claims priority to and the benefit of U.S. patent application Ser. No. 14/031,652, filed on Sep. 19, 2013, which is a continuation of, claims priority to and the benefit of U.S. patent application Ser. No. 13/533,799, filed on Jun. 26, 2012, now U.S. Pat. No. 8,545,308, which is a continuation of, claims priority to and the benefit of U.S. patent application Ser. No. 12/307,705, filed on Feb. 18, 2009, now U.S. Pat. No. 8,221,215, which is a national stage application of PCT/US07/79550, filed on Sep. 26, 2007, which claims the benefit of and priority to U.S. Provisional Patent Application No. 60/826,958, filed on Sep. 26, 2006, the entire contents of which are each incorporated by reference herein.

FIELD OF THE INVENTION

The present invention generally relates to methods, systems, and computer readable media applicable to providing and redeeming partial wagering game outcomes. The wagering games include those that are typically played using electronic game devices, such as slot machines, video poker machines and the like, and that may be used by players in a casino to play wagering games.

Advantages and features of the invention will become apparent upon reading the contents of this document, and the nature of the invention may be more clearly understood by reference to the following detailed description of the invention, the appended claims and to the drawings attached hereto.

BRIEF DESCRIPTION OF THE DRAWINGS

FIG. 3C illustrates an embodiment of a partial outcome database in accordance with the invention that may be used in association with the process of FIG. 3B;

FIG. 3E illustrates an embodiment of a partial outcome database in accordance with the invention that may be used in association with the process of FIG. 3D;

FIG. 4 illustrates an example of a "standard play and partial outcome paytable" for use in association with a selected type of wagering game and used for determining both partial outcomes and completed outcomes, in accordance with an embodiment of the invention;

FIG. 5 illustrates a "Partial Results Achieved Database" that may be maintained by a casino server and/or a remote gaming device in accordance with an embodiment of the invention;

FIG. 6C illustrates a "Bell-Bell Completion Paytable" for a "Big Jackpot Slot Machine" for use in accordance with an embodiment of the invention;

FIG. 6D illustrates a "Cherry-Cherry Completion Paytable" for a "Big Jackpot Slot Machine" for use in accordance with an embodiment of the invention; and FIG. 7 illustrates a "Jackpot-Jackpot Completion Paytable" having a positive expected value (EV) in accordance with an embodiment of the invention.

DETAILED DESCRIPTION OF THE INVENTION

Wagering game players desire things such as the ability to gamble online, an "edge" or perceived edge when gambling, rewards for their patronage, and to realize vacation fantasies at the planning and pre-planning stages. Casinos may find it desirable to attract new customers, get more play and/or loyalty from existing customers, and "traffic manage" patrons who visit their casino floor to desirable locations (route players to underutilized locations, and/or route players to locations offering new experiences, and the like). Manufacturers of gaming devices desire loyalty to their brand and trial of their newest games.

Given these various desires, described herein are methods, systems and computer readable media whereby players can receive partial or "pseudo" game outcomes by using an electronic device (a first device) that may be located outside of a legal gambling jurisdiction (for example, a player uses a personal computer in the comfort of his home, which is located in a part of the country that is remote from a legalized gambling jurisdiction, to visit a Website that is sponsored by a casino in a legalized gambling jurisdiction to obtain one or more partial game outcomes). The generated partial game outcomes can then be "completed" in the legalized gambling jurisdiction (for example, at a slot machine on the casino floor). The partial game outcomes that are provided remotely may entice players to visit a casino to receive the corresponding complete wagering game outcomes.

I. System

A. General System Overview

Figure 1:
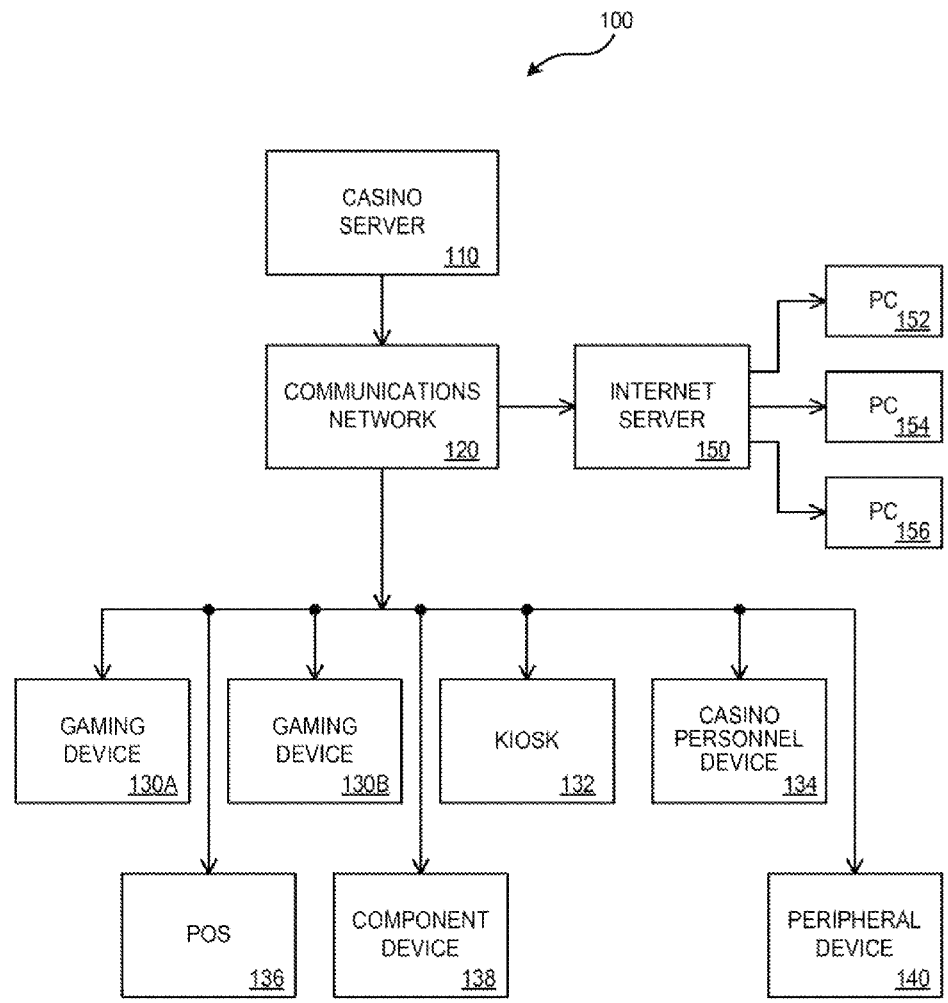
FIG. 1 is a simplified block diagram of a system in accordance with the invention.

FIG. 1 is a simplified block diagram of a system 100 including a computer 110 (e.g., a casino server) that is in communication, via a communications network 120, with one or more devices, such as a plurality of gaming devices 130A, 130B (e.g., slot machines, video poker machines, and the like), kiosks 132, casino personnel devices 134, merchant point-of-sale (POS) terminals 136, component devices 138 (e.g., display screens, touch screens, and the like), peripheral devices 140 (e.g., card readers) and the like. (Each block 130A to 140 may represent numerous devices of the type specified above.) The computer 110 may also be in communication with, via the communications network 120, one or more internet servers 150 operable to administer a "partial outcomes website", for example, that may be accessed by one or more personal computers (PCs) 152, 154, 156 or similar devices that may be owned and/or operated by players.

The computer 110 may communicate with the various devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® processor, that are adapted to communicate with the computer 110. Any number and type of devices may be in communication with the computer 110. Communication between the devices and the computer, and among the devices themselves, may be direct or indirect, such as over the Internet through a Web site maintained by computer on a remote server or over an online data network including commercial online service providers, bulletin board systems and the like. In yet other embodiments, the devices may communicate with one another and/or the computer over RF, cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. A variety of communications protocols may be part of the system, including but not limited to: Ethernet (or IEEE 802.3), SAP, SAS™, SuperSAS™, ATP, Bluetooth, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, content management, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time. In one embodiment, a server computer may not be necessary and/or preferred. For example, the described processes may, in one or more embodiments, be practiced on a stand-alone gaming device and/or a gaming device in communication only with one or more other gaming devices. In such an embodiment, any functions described as performed by the computer or data described as stored on the computer may instead be performed by or stored on one or more gaming devices.

B. Gaming Device

Figure 2:
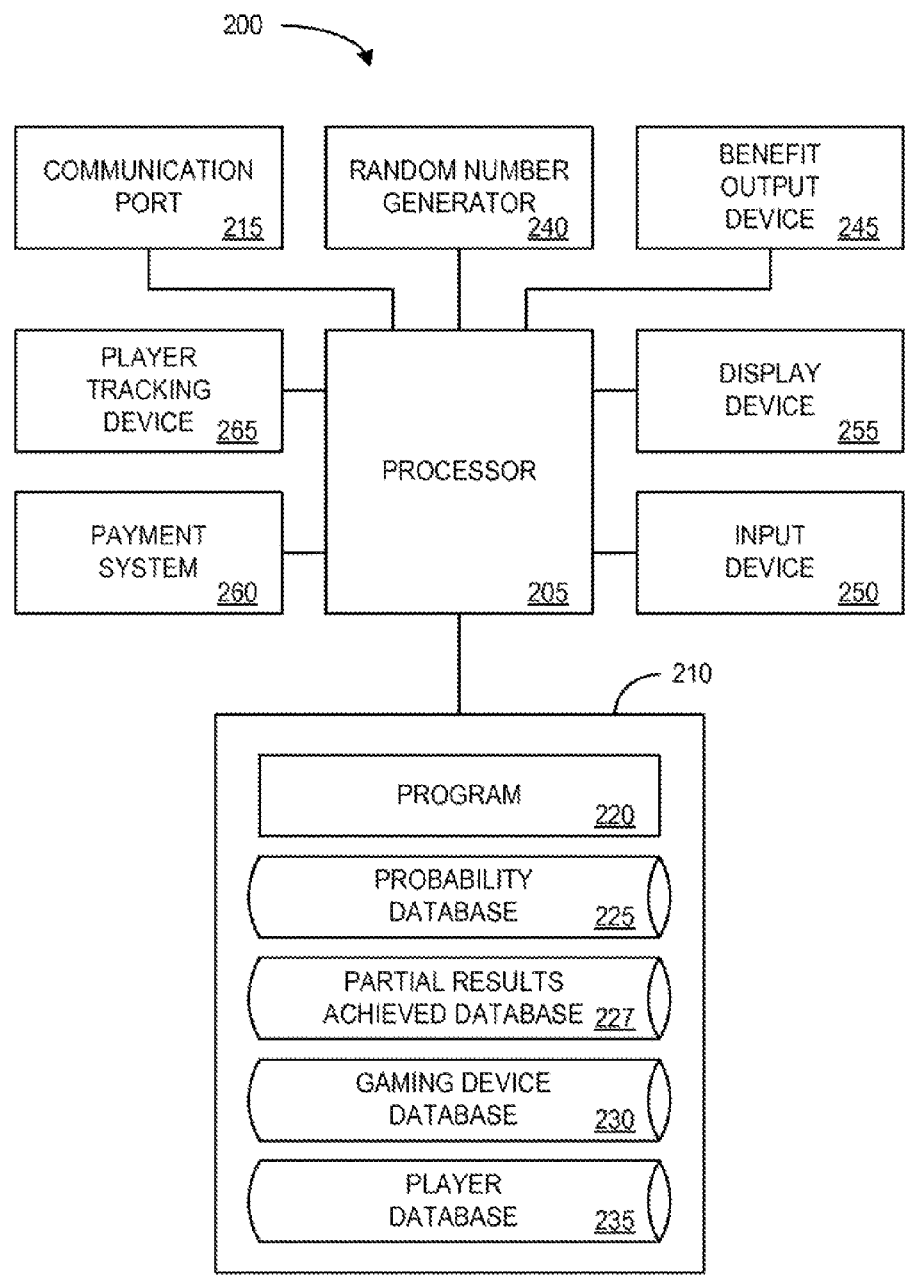
FIG. 2 is a simplified block diagram of a gaming device suitable for use with the system of FIG. 1.

FIG. 2 is a block diagram of an example embodiment 200 of a gaming device. The gaming device 200 may be implemented as a system controller, a dedicated hardware circuit, an appropriately programmed general-purpose computer, or any other equivalent electronic, mechanical or electromechanical device. The gaming device 200 may comprise, for example, a slot machine, a video poker machine, a video blackjack machine, a video keno machine, a video lottery machine, a pachinko machine or a table-top game. In various embodiments, a gaming device may comprise, for example, a personal computer (e.g., which communicates with an online casino Web site), a telephone (e.g., to communicate with an automated sports book that provides gaming services), or a portable handheld gaming device (e.g., a device similar to a personal digital assistant (PDA), Nintendo™ GameBoy™ device, Sony™ PSP™ device, or other appropriate device). The gaming device may comprise any or all of the gaming devices of the aforementioned systems.

In some embodiments, a gaming device may comprise a personal computer or other device, which may be operable to communicate with an online casino and facilitate game play at the online casino. In one or more embodiments, the gaming device 200 may comprise a computing device operable to execute software that simulates play of a reeled slot machine game, video poker game, video blackjack game, video keno game, video roulette game, or lottery game.

In some embodiments, a user device such as a PDA or cell phone may be used in place of, or in addition to, some or all of the gaming device components. For example, in some embodiments, a gaming device may comprise a wireless handheld device similar to the WifiCasino GS offered by Diamond I Technologies of Baton Rouge, La. In some embodiments, a casino server may generate partial outcomes and transmit them to a player's wireless handheld device (such as a cell phone). The partial outcomes may be transmitted using text (SMS), multimedia (MMS), or voicemail messages. It should be noted that partial outcomes may be very brief. For example, a text message for a hand of video poker cards may read: "Ace-hearts King-hearts Queen-hearts Three-diamonds Four-diamonds", whereas a text message for three reels of a slot machine (wherein the fourth reel has not yet spun) may be: "bar-bar-bar-?" (wherein the question mark ("?") is a place-holder that represents a missing icon and/or symbol required to provide a complete outcome).

Use by a player of a PDA or cell phone is advantageous because there is no need for player to rent a wireless handheld device from casino, and there is no need for a casino to build and/or to stock custom devices. Furthermore, from the point of view of a casino, such a system is relatively easy to set up, for example, because sending text messages from a casino server is simple. In addition, use of a casino server or other type of gaming controller may facilitate passive gaming, wherein there is no need for player to actively request outcomes. For example, a wireless device such as a customized pager or a cell phone is easy and convenient for the player to carry while engaged in activities outside of casino (for example, playing golf or receiving a spa treatment). Such devices may be configured to receive, for example, text messages that contain partial outcomes according to, for example, a predetermined schedule set up by the player. Thus, for example, a player may sign up to receive one partial outcome every five minutes between the hours of one and three o'clock on Monday afternoons when she knows that she will be food shopping. The player can choose to ignore, queue up, or review the partial outcomes as they come in, or turn off her cell phone (for example, while she is watching a movie) and have the partial outcomes go into an electronic message box.

Referring to FIG. 2, the gaming device 200 includes a processor 205 that may communicate with a memory 210. The processor 205 is also operatively connected to a communications port 215 (e.g., so as to communicate with one or more other devices). The memory 210 may comprise an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The processor 205 and the memory 210 may each be, for example: (i)

located entirely within a single computer or other device; or (ii) connected to each other by a remote communication medium, such as a serial port cable, telephone line or radio frequency transceiver. In one embodiment, the gaming device 200 may comprise one or more devices that are connected to a remote server computer for maintaining databases.

The memory 210 stores a program 220 for controlling the processor. The processor 205 may perform instructions of the program 220, and thereby operate in accordance with various embodiments, and particularly in accordance with the methods described in detail herein. The program 220 may be stored in a compressed, un-compiled and/or encrypted format. The program furthermore includes program elements that may be necessary, such as an operating system, a database management system and "device drivers" for allowing the processor 205 to interface with computer peripheral devices. Appropriate program elements are known to those skilled in the art, and need not be described in detail herein.

The memory 210 may also store one or more databases. For example, memory 210 may store one or more of a probability database 225, one or more of a payout database 230, and/or one or more of a player database 235 that may contain identity data associated with a plurality of players.

In some embodiments (e.g., in an embodiment in which a server manages downloadable games playable on one or more gaming devices), the memory 210 may store additional databases. Examples of such additional databases include, but are not limited to, (i) a gaming device database that stores information related to one or more gaming devices with which the controller is operable to communicate; (ii) a game database that stores information regarding one or more games playable on downloadable and/or currently active in association with one or more gaming devices; and (iii) a scheduling and/or configuration database useful for determining which games are to be made available on which gaming devices.

Similarly, in one embodiment a server may be operable to configure a gaming device 200 remotely, update software stored on a gaming device and/or to download software or software components to a gaming device. For example, a server may be operable to apply a hot fix to software stored on a gaming device, modify a payout and/or probability table stored on a gaming device and/or transmit a new version of software and/or a software component to a gaming device. A server may be programmed to perform any or all of the above functions based on, for example, an occurrence of an event (e.g., a scheduled event), receiving an indication from a qualified casino employee and/or other person (e.g., a regulator) and/or receiving a request from a player. Alternately or additionally, in some embodiments, a "peer-to-peer" relationship between a first and second gaming device may be utilized, such that a first gaming device may store content in one or more databases which may be accessed by a second gaming device, a first gaming device may remotely configure a second gaming device, and so on.

The processor 205 in the example gaming device 200 may comprise one or more Intel® Pentium® processors, or one or more processors manufactured by other companies, such as Advanced Micro Devices, Incorporated. The processor 205 is operable to communicate with a random number generator 240, which in this example is a component of the gaming device 200. The random number generator, in accordance with at least one embodiment, may generate data representing random or pseudo-random values (referred to as "random numbers" herein). The random number generator 240 may generate a random number, for example, every predetermined unit of time (e.g., every thousandth of a second) or in response to an initiation of a game on the gaming device 200. In the former embodiment, the generated random numbers may be used as they are generated (e.g., the random number generated at substantially the time of game initiation is used for that game) and/or stored for future use. A random number generated by the random number generator 240 may be used by the processor 205 to determine, for example, at least one of an outcome and payout.

A random number generator, as used herein, may be embodied as a processor separate from but working in cooperation with the processor. Alternatively, the random number generator may be embodied as an algorithm, program component, or software stored in the memory of the gaming device and used to generate a random number. Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

Of course, as would be understood by one of ordinary skill in the art, a random number generator may be stored or housed or embodied in a device other than a gaming device. For example, in some embodiments, a gaming device 200 may receive random numbers and/or any other data related to the random or pseudo-random determination of an outcome from a separate device, such as a server. It should be noted that such embodiments may be advantageous in environments or jurisdictions wherein the "central determination" of outcomes is required by regulation or otherwise preferred. Thus, for example, outcomes may be determined centrally by a server, and then propagated (e.g., electronically) such that indications of the outcomes may be viewed using one or more gaming devices (e.g., "Class II" gaming devices, "thin-client"-oriented gaming devices in a server-based "Class III" network architecture, Video Lottery Terminals, and so on).

The processor 205 may also be operable to communicate (e.g., via a protocol such as GDS) with various component devices associated with the gaming device, including but not limited to benefit output devices 245, input devices 250, and/or input/output devices.

In some embodiments, a benefit output device 245 may be a component of the gaming device 200. The benefit output device 245 may comprise one or more devices for outputting a benefit to a player of the gaming device 200. For example, in one embodiment the gaming device 200 may provide coins and/or tokens as a benefit. In such an embodiment the benefit output device 245 may comprise a hopper and hopper controller, for dispensing coins and/or tokens into a coin tray of the gaming device. In another example, the gaming device 200 may provide a receipt or other document on which there is printed an indication of one or more benefits (e.g., a cashless gaming ticket as is known in the art). In such an embodiment, the benefit output device 245 may comprise a printing and/or document dispensing mechanism. In yet another example, the gaming device may provide electronic credits as a benefit (which, e.g., may be subsequently converted to coins and/or tokens and dispensed from a hopper into a coin tray). In such an embodiment, the benefit output device may comprise a credit meter balance and/or a processor that manages the amount of electronic credits that is indicated on a display of a credit meter balance. In yet another example, the gaming device 200 may credit a monetary amount to a financial account associated with a player as a benefit provided to a player. The financial account may be, for example, a credit card account, a debit account, a charge account, a checking account, or a casino account (e.g., an account from which the player may access cashable and/or non-cashable funds using a player tracking card or smart card). In such an embodiment the benefit output device 245 may comprise a device for communicating with a server on which the account is maintained. Note that, in one or more embodiments, the gaming device 200 may include more than one benefit output device 245. For example, the gaming device 200 may include both a hopper and hopper controller combination and a credit meter balance. Such a gaming device 200 may be operable to provide more than one type of benefit to a player of the gaming device. A single benefit output device may be operable to output more than one type of benefit. For example, a benefit output device may be operable to increase the balance of credits in a credit meter and communicate with a remote device in order to increase the balance of a financial account associated with a player.

The processor 205 may also be operable to communicate with other various output devices. In some embodiments, an output device comprises a display device 255. The display device 255 may comprise, for example, one or more display screens or areas for outputting information related to game play on the gaming device 200, such as a cathode ray tube (CRT) monitor, liquid crystal display (LCD) screen, or light emitting diode (LED) screen. In one or more embodiments, a gaming device 200 may comprise more than one display device 255. For example, a gaming device 200 may comprise an LCD display for displaying electronic reels and a display area that displays rotating mechanical reels. The display device 250 may comprise, for example, one or more display areas. For example, one of the display areas (e.g., a primary game screen) may display outcomes of games played on the gaming device 200 (e.g., electronic reels of a gaming device). Another of the display areas (e.g., a secondary game screen) may display rules for playing a game of the gaming device. Yet another of the display areas may display the benefits obtainable by playing a game of the gaming device 200 (e.g., in the form of a payout table).

The processor 205 may also be in communication with one or more other output devices besides the display device 250, for outputting information (e.g., to a person or another device). Such other one or more output devices may also be components of a gaming device 200. Such other one or more output devices may comprise, for example, an audio speaker (e.g., for outputting an outcome or information related thereto, in addition to or in lieu of such information being output via a display device); headphones; an infra-red transmitter; a radio transmitter; an electric motor; a printer (e.g., such as for printing cashless gaming tickets); a dispenser for outputting pre-printed coupons, tickets or vouchers; an infrared port (e.g., for communicating with a second gaming device or a portable device of a player); one or more universal serial bus (USB) ports; a Braille computer monitor; and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The processor 205 may also be in communication with one or more input devices, which may be capable of receiving an input (e.g., from a player or another device) and which may be a component of gaming device 200. Alternately or additionally, an input device may communicate with or be part of another device (e.g., a server, a gaming device, etc.). Some examples of input devices include: a bar-code scanner, an optical scanner configured to read other indicia of a voucher or cashless gaming ticket, a CCD camera, a magnetic stripe reader (e.g., for reading data encoded upon a player tracking card), a smart card reader (e.g., for reading data stored upon a smart card), a computer keyboard or keypad, a button, a handle, a lever, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices 200, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor may also be in communication with a payment system 260, which may be a component of the gaming device 200. The payment system 260 is a device capable of accepting payment from a player (e.g., a bet or initiation of a balance) and/or providing payment to a player (e.g., a payout). Payment is not limited to money, but may also include other types of consideration, including products, services, and alternate currencies. Exemplary methods of accepting payment by the payment system 260 may include (i) receiving hard currency (i.e. coins or bills), and accordingly the payment system 260 may comprise a coin or bill acceptor; (ii) receiving an alternate currency (e.g., a paper cashless gaming ticket, an electronic credit, a coupon, a non-negotiable token), and accordingly the payment system 260 may comprise a bar code reader or other sensing means; (iii) receiving a payment identifier (e.g., a credit card number, a debit card number, a player tracking card number, a financial account identifier) and debiting the account identified by the payment identifier; and (iv) determining that a player has performed a value-added activity (e.g., participating in surveys, monitoring remote images for security purposes, referring friends to the casino).

Processor 205 is further operable to communicate with a player tracking device 265, which may be a component of the gaming device 200. Player tracking device 265 may, in some embodiments, be considered an example of an input device 250 and/or an example of a payment system 260 (e.g., in embodiments in which a player provides a payment by providing a player identifier that also functions as a monetary account identifier). Player tracking device 265 may, in one or more embodiments, comprise a reader device operable to read information from and/or write information to a card such as a smart card and/or a player tracking card, such that (i) players may be identified, and (ii) various data associated with players may then be determined. For example, previous wagering, coin-in and/or cash-out behaviors previously engaged in by the player may be determined based on information associated with the player identifier. In another example, previous strategies employed in a video poker game may be similarly determined. Similarly, a number of cashable credits available to the player may be determined, a code or other indication of a benefit to be provided to the player may be determined, a number of accumulated loyalty points associated with the player may be determined, a number of accumulated game elements such as symbols, cards or hands associated with the player may be determined, etc.

In one embodiment, the player tracking device 265 may comprise (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT™ or the iVIEW™ display screen manufactured by Bally Gaming and Systems™.

Of course, other non-card-based methods of identifying players are contemplated. For example, a unique identification code may be associated with the player. The player may then be identified upon entering the code. For example, the code may be stored (e.g., within a database 235 maintained within a gaming device 200 and/or maintained within a central server) such that the player may enter the code using an input device 250, and accordingly allow the player to be uniquely identified. In other embodiments, player biometrics may serve as identification means (e.g., a player is identified via a thumbprint or retinal scan of the player). In further embodiments, a barcode of a cashless gaming ticket may encode a player identifier.

Thus, as described, various data associated with a player may be tracked and stored (e.g., in an appropriate record of a centrally-maintained database), such that it may be accessed as desired. Further, various statistics may be measured in association with a player (e.g., coin-in statistics, win/loss statistics, buy-in amount for a play session) and similarly accessed.

In some embodiments, a gaming device 200 may comprise components capable of facilitating both input and output functions (i.e., input/output devices). In one example, a touch-sensitive display screen comprises an input/output device (e.g., the device outputs graphics and receives selections from players). In some embodiments, a touch-sensitive display screen may comprise force-feedback technology for outputting physical stimulus to players (Immersion TouchSense®, an example of such technology, is manufactured by Immersion Corporation of San Jose, Calif.). In another example, a processor may communicate with a "ticket-in/ticket-out" device configured to dispense and receive cashless gaming tickets as is known in the art. Such a device may also assist in (e.g., provide data so as to facilitate) various accounting functions (e.g., ticket validation and redemption). For example, any or all of a gaming device, kiosk and casino personnel device maintained at a cashier cage may (i) comprise such a benefit input/output device, and/or (ii) communicate with a central server that manages the accounting associated with such ticket-in/ticket-out transactions (e.g., so as to track the issuance, redemption and expiration of such vouchers). One example of such ticket-in/ticket-out technology, the EZ Pay™ system, is manufactured by International Gaming Technology, headquartered in Reno, Nev.

It should be appreciated that one or more gaming device 200 embodiments may include storing graphic and/or sound elements that are used to construct a menu of options available for a player's selection via a touch screen. These elements may be stored, for example, in EEPROM, flash memory, hard disk, CD-ROM, or in any other suitable storage device. The menu may be displayed via any suitable display device, such as a CRT, LCD, VFC, LED display. In one embodiment, the menu may be implemented using only dedicated electromechanical switches. In one embodiment, a player operates an input device of the gaming device to cause such a menu to be displayed. In one embodiment, a gaming device includes a touch screen and a touch screen controller (not shown) associated with a video monitor display device. The touch screen and touch screen controller may be operable to communicate with a video controller of the video monitor display device and a processor (e.g., processor of gaming device). Thus, a player may be enabled to indicate decisions (e.g., select an option for requesting completion of one or more partial game outcomes) by touching the touch screen in the appropriate places.

In some embodiments, display of the menu of player options may preempt display of other information. For example, in one embodiment the same display device or screen used to display game play elements (e.g., video reels of a slot machine) during active game play may be used to provide a menu of available options. In another embodiment, a dedicated display device or screen may be used to display a menu of available options on a continuous, periodic, or other basis.

Of course, as would be understood by one of ordinary skill in the art, a gaming device 200 may comprise various combinations of such component devices. For example, in one or more embodiments, the gaming device 200 may include more than one display device 255, one or more other output devices, several input devices 250, and so on (e.g., two display screens, two audio speakers, a ticket-in/ticket-out device and several buttons).

The term "computer-readable medium" as used herein refers to any medium that participates in providing instructions to the processor 205 of the gaming device 200 (or any other processor of a device described herein) for execution. Such a medium may take many forms, including but not limited to, non-volatile media, volatile media, and transmission media. Non-volatile media include, for example, optical or magnetic disks, flash memory, and the like. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor 205 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 200 (or, e.g., a server) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, the gaming device may obtain instructions in the form of a carrier wave.

According to an embodiment, the instructions of the program may be read into a main memory from another computer-readable medium, such from a ROM. Execution of sequences of the instructions in program causes processor perform the process steps described herein. In alternate embodiments, hard-wired circuitry may be used in place of, or in combination with, software instructions for implementation of the processes described herein. Thus, embodiments of the present methods are not limited to any specific combination of hardware and software. As discussed with respect to aforementioned systems, execution of sequences of the instructions in a program of a peripheral device in communication with the gaming device may also cause the processor to perform some of the process steps described herein.

The memory may store one or more databases described herein. Some or all of the data stored in each database is also described. The described entries of the databases represent exemplary information only; those skilled in the art will understand that the number and content of the entries can be different from those illustrated herein. Further, despite any description of the databases as tables, an object-based model could be used to store and manipulate the data types described herein and likewise, object methods or behaviors can be used to implement the described processes.

Where appropriate, a conventional probability database 225 may be utilized in the performance of the processes described herein. A probability database 225 may be stored in the data storage device in tabular form, or any other appropriate database form, as is well known in the art. The data stored therein may include a number of exemplary records or entries, each defining a random number. Those skilled in the art will understand that the probability database 225 may include any number of entries. The tabular representation may also define fields for each of the entries or records. The fields may specify: (i) a random number (or range of random numbers) that may be generated by the random number generator 240; and (ii) an outcome that indicates the one or more indicia comprising the outcome that corresponds to the random number of a particular record. A gaming device 200 may utilize a probability database 225 to determine, for example, what outcome corresponds to a random number generated by a random number generator and to display the determined outcome. The outcomes may comprise the three symbols to be displayed along the payline of a three-reel slot machine. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

Further, where appropriate, a partial results achieved database 227 and a gaming device database 230 may be utilized. The partial results database 227 and the gaming device database 230 may be stored in the data storage device 210 in tabular form, or any other appropriate database form. Data stored in the partial results achieved database 227 and the gaming device database 230 may include a number of example records or entries, each defining an outcome that may be obtained on a gaming device 200 that corresponds to a payout. For example, the partial results achieved database 227 may include data such a player identifier, partial results, completion paytable identifiers and a completion indicator field, and the gaming device database 230 may include outcome identifiers, probability data, payout data, and expected value data for use in the performance of the processes described herein. Those skilled in the art will understand that the partial results achieved database 227 and the gaming device database 230 may include any number of entries. The tabular representation also defines fields for each of the entries or records, for example, particular fields may specify: (i) an outcome, which indicates the one or more indicia comprising a given outcome; and (ii) a payout that corresponds to each respective outcome. The outcomes may be those obtained on a three-reel slot machine.

A gaming device 200 may utilize the gaming device database 230 to determine whether a payout should be output to a player as a result of an outcome obtained for a game. For example, after determining the outcome to output on the gaming device 200, the gaming device may access the gaming device database 230 to determine whether the outcome for output is one of the outcomes stored as corresponding to a payout. If it is, the gaming device may provide the corresponding payout to the player.

Other arrangements of payout databases are possible. For example, the book "Winning At Slot Machines" by Jim Regan (Carol Publishing Group Edition, 1997) illustrates many examples of payout and probability tables and how they may be derived.

Additionally, where appropriate, a player database may be utilized to store historical data associated with specific players. A player database may be used, for example, to store player wager data so that players wagering over a given threshold in a given amount of time may be rewarded for their patronage. The player database may also contain other information that may be useful in, for example, promoting and managing player behaviors (e.g., information about the player's gaming preferences, gaming sessions, outstanding debts, lodging arrangements, and the like). Further, the player database may store data regarding a given player's standing in a game session or bonus game, so that the player can continue the game session or bonus game at a plurality of game machines that have common access to the player database. Such player data may be stored in a relational database and retrieved or otherwise accessed by the processor 205 after receiving a "key" data point from the player, such as a unique identifier read from the player's player tracking card or cashless gaming ticket, PIN or code entered by a player using an input device 250 of a gaming device 200, and so on.

Note that, although these databases may be described as being stored in a gaming device, in other embodiments some or all of these databases may be partially or wholly stored in another device, such as one or more of the peripheral devices, the peripheral device server, central server, kiosks, casino personnel devices, merchant POS terminals, and so on. Further, some or all of the data described as being stored in the databases may be partially or wholly stored (in addition to or in lieu of being stored in the memory of the gaming device) in a memory of one or more other devices, such as one or more of the peripheral devices, another gaming device, the peripheral device server and/or the server.

In an embodiment, a gaming device may be operable to facilitate downloadable games such that games available for play on the gaming device may be stored on a server device (e.g., a server or another dedicated device) and downloaded to the gaming device. In an embodiment, software components of the gaming device may be remotely modified and/or updated by another device (e.g., a server or another device). For example, a payout table or probability table stored in the memory of a gaming device may be altered, modified or updated remotely, hot fixes may be applied to software stored by the gaming device and/or new versions of software may be downloaded to the gaming device. Similarly, the gaming device may be programmed to retrieve any or all such updates from another device, as appropriate and preferred. Any of the above (e.g., downloading of a game, updating of software, modification of a payout or probability table) may occur, for example, based upon an occurrence of an event (e.g., a scheduled event), an indication being received from qualified casino personnel or other personnel (e.g., a regulator), and/or upon a request from a player. In an embodiment, a gaming device may comprise a thin client device controlled be a server device (e.g., a server or another dedicated device such as a peripheral device server).

C. Gaming Device as Slot Machine

As discussed herein, in one or more embodiments the game device may take the form of a slot machine configured to operate in conjunction with various embodiments. A more specific description of a slot machine suitable for such purposes follows.

A slot machine for use with the described processes may comprise, for example, a three-reel or five-reel slot machine. The slot machine comprises a display area in which an outcome for a game of the slot machine is displayed to the player. The display area may, for example, be a video display that displays graphical representations of reels. The display area may, in another example, be glass behind which are located mechanical reels. Within the display area is at least one payline. In accordance with one or more embodiments, an outcome of a game is a set of symbols displayed along a payline of a reeled slot machine. The slot machine may further comprise a handle. A player may initiate the movement of the reels in the display area by pulling on the handle. Alternatively, a player may initiate the movement of the reels in the display area by actuating a start button or "spin" button (such a button may alternately be labeled "daub" in a Class II gaming environment or "enroll" in an environment where outcomes are requested from and determined by a device other than the gaming device). Either or both of the handle and start button are exemplary embodiments of an input device, described herein.

Where appropriate, the slot machine may also include an alternate, secondary game screen, for outputting information (e.g., payout information, outcome information, etc.) to a player. The secondary game screen may be utilized, for example, to inform a player of the player's standing in a game. The slot machine may be capable of altering display and audio content as described herein (e.g., superimposing graphics over digital displays; a mask layer between physical reels and a player that shades or otherwise alters their appearance).

The slot machine may also include a payment system, which is comprised of a bill acceptor, a credit card reader, a coin acceptor, and/or a ticket-in/ticket-out device (TITO device). The TITO device may be configured to read a barcode or other code printed on, for example, a cashless ticket that indicates a cash amount. A player may utilize the payment system to provide a wager for playing a game and/or for providing payment for provision of an outcome.

The slot machine may further comprise a credit meter balance, which is an exemplary embodiment of a benefit output device described herein. The credit meter balance reflects the amount of electronic credits currently available to a player. The player may use the electronic credits, for example, as wagers for games played on the gaming device. The electronic credits may also be "cashed out" as coins, bills, tokens, a cashout ticket, a cashout strip, and/or electronic credits to another financial account associated with the player.

Finally, the slot machine may include a coin tray. Payment may be rendered to a player by dispensing coins into the coin tray. Such coins may be dispensed based on, for example, a player's indication that the player would like to cash out his credit meter balance and/or a payout obtained by a player as a result of playing a game on the slot machine. The coin tray is an exemplary embodiment of a benefit output device, described herein. Note that, where appropriate, the slot machine may include different and/or additional components besides those discussed in this section, as desirable and/or as required.

D. Other Devices

A "remote gaming device" may determine (e.g., randomly, by selecting a partial outcome from a predetermined list of partial outcomes) and indicate one or more partial outcomes. A remote gaming device may comprise, for example: a personal computer, a handheld and/or wireless device (for example, a device designed specifically for gaming applications, or a general use device such as a cell phone, PDA or iPod™), a hotel room television and/or set-top box, a cable television unit, and the like. Partial outcomes may be (i) stored in memory of such device; (ii) stored in memory of a server device in communication with the remote device; (iii) generated/determined randomly by the remote device, etc. Thus, such a remote gaming device may comprise: (i) one or more output devices for outputting partial outcomes (e.g., a display screen, speakers), (ii) one or more input devices (e.g., a button that a player may actuate to signal his desire to view/generate a partial outcome), (iii) a memory (e.g., for storing a software program to execute one or more steps, for storing one or more databases, and the like), and/or (iv) a communications port (e.g., for communicating with a server).

E. Retrofitting Existing Gaming Devices

In one or more embodiments, various aspects, such as determining and completing partial outcomes previously provided to a player, may be practiced by replacing and/or augmenting one or more components (e.g., hardware and/or software components) of an existing gaming device. Thus, in one or more embodiments, existing gaming devices currently available for play within various casinos may be retrofit or upgraded to accommodate the processes described herein.

For example, a memory (e.g., computer chip) of the gaming device may be replaced or added, the replacement or additional memory storing a program for instructing the processor of the gaming device to operate in accordance with one or more embodiments described herein. In another example, data output via the gaming device (e.g., graphical and/or textual data displayed on the gaming device) may be replaced or added, the replacement or additional data indicating to a player information relevant to one or more aspects described herein.

In a specific example, a gaming device may comprise various electronic components mounted to one or more printed circuit boards (PCBs). Such components may include various hardware devices and/or components described herein, such as a communications port and various controllers of peripheral devices (e.g., a display controller), as well as a memory for storing programming instructions (software) and a processor for carrying out such instructions. One form of memory commonly found in gaming devices is electronically erasable programmable read-only memory or erasable programmable read-only memory (EEPROM or EPROM). Thus, in one or more embodiments, an EEPROM storing software with instructions for carrying out aspects of the described processes (as well as instructions for carrying out other functions traditionally performed by the gaming device) may replace an EEPROM previously installed in a gaming device, such that the gaming device may be configured to operate in accordance with the various processes disclosed herein.

For example, a "partial outcome module" may be made available for purchase to various casino operators. The module, which may comprise various hardware and software (e.g., an EEPROM storing software instructions), may be installed in an existing gaming device (e.g., a video-reel slot machine, a video poker machine, etc.), such that when the module is installed, players of the device may elect (i) to play a game offered by the gaming device that does not incorporate aspects of the processes described herein, or (ii) to play a game offered by the gaming device in a manner that utilizes aspects of the processes described herein. Thus, players who are familiar with the games offered by various gaming devices may elect to pay for them in a different or similar manner, as they are accustomed.

Accordingly, a gaming device may be configured to allow a player to select one of two "modes" of the gaming device, and to enable the selected mode. If a player selects a "standard" mode, the gaming device may be configured to operate in a manner similar to how it operated before the installation of the module (e.g., the gaming device operates in a conventional manner, such that aspects of the processes described herein may not be utilized). If a player selects a "partial outcome redemption" mode, the gaming device may then be operable to execute game play in accordance with one or more aspects of the processes described herein. Thus, such a gaming device may be characterized as a "dual mode gaming device" because it is capable of providing both a standard play mode of operation and a partial outcome redemption mode of operation.

For example, a touch-sensitive display screen may be configured to output a prompt asking a player to select a mode of operation from a menu. Such a prompt may be output in occurrence to various trigger conditions (e.g., coins, bills or tickets are inserted; a credit balance increases from zero to some other number; a player presses a "play" button; a motion, weight, infrared or other sensor detects the presence of a player; and the like). Accordingly, a player may select a mode of operation (e.g., by pressing an appropriately labeled icon of a touch-sensitive display screen), and upon receiving the player's selection, the gaming device may be configured to operate in the selected mode.

In some embodiments, as described, a peripheral device may be useful for implementing one or more of the described processes into the operation of a conventional gaming device. For example, in order to avoid or minimize the necessity of modifying or replacing a program already stored in a memory of a conventional gaming device, an external or internal module that includes a peripheral device may be inserted in, connected to, or otherwise associated with the gaming device.

In still further embodiments, rather than configure existing gaming devices to execute various aspects described herein, such as by installing or connecting new hardware and/or software, software may be downloaded into an existing memory of one or more gaming devices. U.S. Pat. No. 6,805,634 to Wells et al. teaches methods for downloading data to gaming devices in such a manner. The entirety of U.S. Pat. No. 6,805,634 is incorporated by reference herein for all purposes. Thus, in some embodiments, an existing gaming device may be reprogrammed to accommodate new functionality of the described processes without the need, or by minimizing the need, to remove and replace hardware within the gaming device.

II. Processes

Figure 3A:
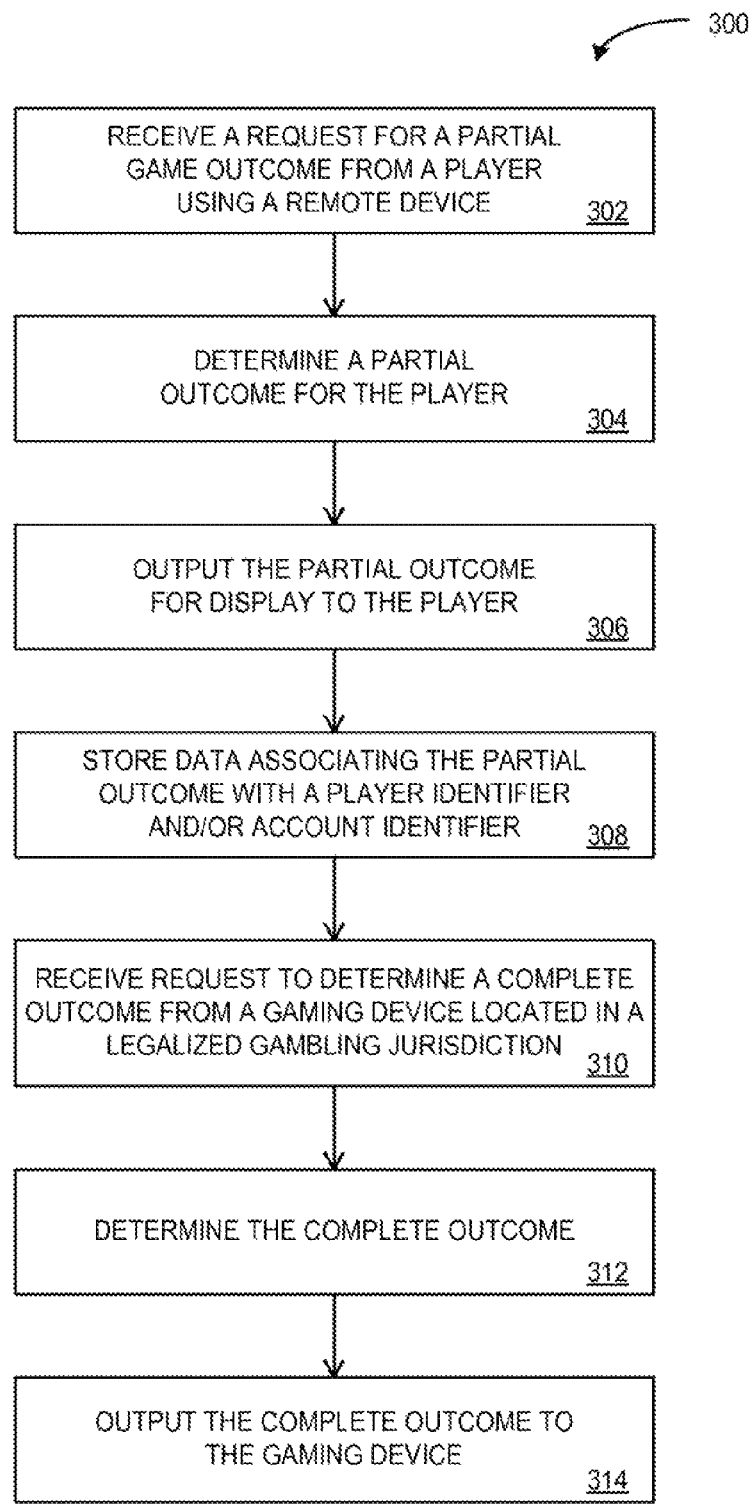
FIG. 3A is a simplified flowchart of an embodiment of a process in accordance with the invention for determining a partial outcome, outputting the partial outcome, receiving a request for a complete outcome, determining a complete outcome, and outputting the complete outcome to a device in a legalized gambling jurisdiction.

FIG. 3A is a simplified flowchart 300 illustrating an embodiment of an overall process for determining a partial outcome, outputting the partial outcome, receiving a request for a complete outcome, determining a complete outcome, and then outputting the complete outcome to a device in a legalized gambling jurisdiction. It is contemplated that a player could request a partial outcome of a wagering game in any of a number of ways, and could receive a complete outcome in a number of ways, which will be explained in detail below.

Referring to FIG. 3A, the example process 300 includes receiving a request for a partial game outcome from a player using a remote device 302 (such as a personal computer), determining a partial outcome 304 for the player, and outputting the partial outcome for display to the player 306. For example, a player may utilize a personal computer to both request and receive the partial game outcome. In this embodiment, the method includes storing data associating the partial outcome with a player identifier and/or with an account identifier 308. Such data may be stored, for example, in a database that is accessible by a casino server. The example process also includes receiving a request 310 to determine a complete outcome from a gaming device located in a legalized gambling jurisdiction, wherein the complete outcome is associated with the partial outcome provided by the player. The gaming device could be, for example, a personal computer that is located in the legalized gambling jurisdiction, or a slot machine on the casino floor.

The method illustrated by FIG. 3A further includes determining the complete outcome 312, and then outputting the complete outcome 314 to the gaming device, which is located in the legalized gambling jurisdiction (for example, the gaming device may be a casino slot machine that includes a display for viewing outcomes). It should be noted that, in some embodiments, some of the various process steps shown may not be necessary, or may occur in an alternate order. In addition, both the first device and the gaming device may be located in the same jurisdiction (for example in a legalized gambling jurisdiction), or both may be located in different locations and/or jurisdictions.

Figure 3B:
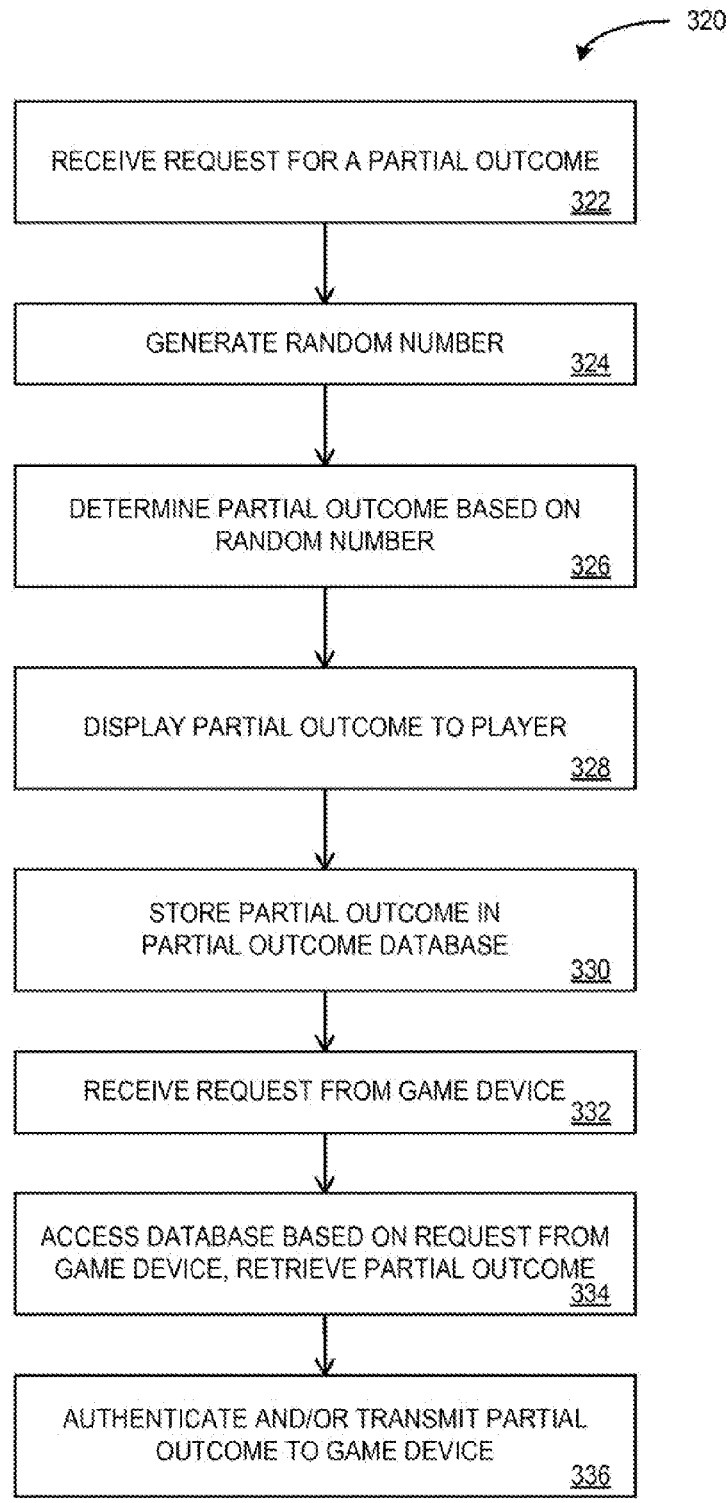
FIG. 3B illustrates an embodiment of a process for determining partial outcomes and displaying them to a player in accordance with the invention.

FIG. 3B illustrates an example process 320 for determining partial outcomes and displaying them to a player. In particular, the example process 320 includes receiving a request for a partial game outcome from a player 322, generating a random number 324, determining a partial outcome based on the random number 326, displaying the partial outcome 328 to the player, and storing the partial outcome in a partial outcome database 330. In an implementation, the player uses a remote device (such as a cell phone, PDA, an internet communication device, or a personal computer) to request the partial game outcome, and the partial game outcome could be displayed or otherwise provided to the player on that same remote device. In some embodiments, the random number may be generated by a gaming device, and the gaming device may also determine the partial outcome based on that random number. In other embodiments, the random number may be generated by a third device, and the gaming device (or other device controlled by an entity such as a casino) then determines the partial outcomes based on that random number. The method of FIG. 3B also includes receiving a request from a gaming device 332 to generate complete outcomes, accessing the partial outcome database based on the request, and retrieving the partial outcome data 334. Next, the partial outcome is authenticated and/or transmitted 336 to the game device. Authentication may include validating an associated partial outcome identifier, or a code, or a player identifier (which data could be stored in a partial outcome database, such as the database 340 described below). In addition, the same gaming device that generated the partial game outcome may also be used to generate the complete game outcome, or a different device may be used to generate the complete game outcome. In this embodiment, the partial game outcomes are generated before any completed game outcomes are generated. However, it is contemplated that partial game outcomes may be determined along with, or at the same time as, the complete game outcomes are determined, as explained below.

FIG. 3C illustrates a partial outcome database 340 that may be used in association with the process 320 of FIG. 3B. The partial outcome database includes a random numbers column 342, a partial outcome field 344, and a partial outcomes identifier column 346. Accordingly, referring to the process 320 shown in FIG. 3B, when a request is received from a player to generate partial outcomes, the random number that is generated is used to determine a partial outcome and to assign a partial outcome identifier. For example, if a random number of "278" is generated, then the random number column 342 is consulted and the partial outcome "Bell-Bell-?" is found and displayed to the player (wherein the question mark ("?") is a place-holder that represents a missing icon and/or symbol required to provide a complete outcome). A partial outcome identifier of "PO-000003" is also assigned. If a random number of "7892" was generated instead, then the random number column 342 indicates that the partial outcome is "Partial Non-Win", which means that any non-winning combination may be displayed to the player (for example, any non-winning combination such as "Bell-Bar-?" or "Jackpot-Cherry-?" could be displayed, because any such combinations, based on the definition of the slot machine game being played, do not have any corresponding third reel outcome that could make any such combinations into a winning combination). In this case, a partial outcome identifier of "PO-00000N" is also assigned.

Figure 3D:
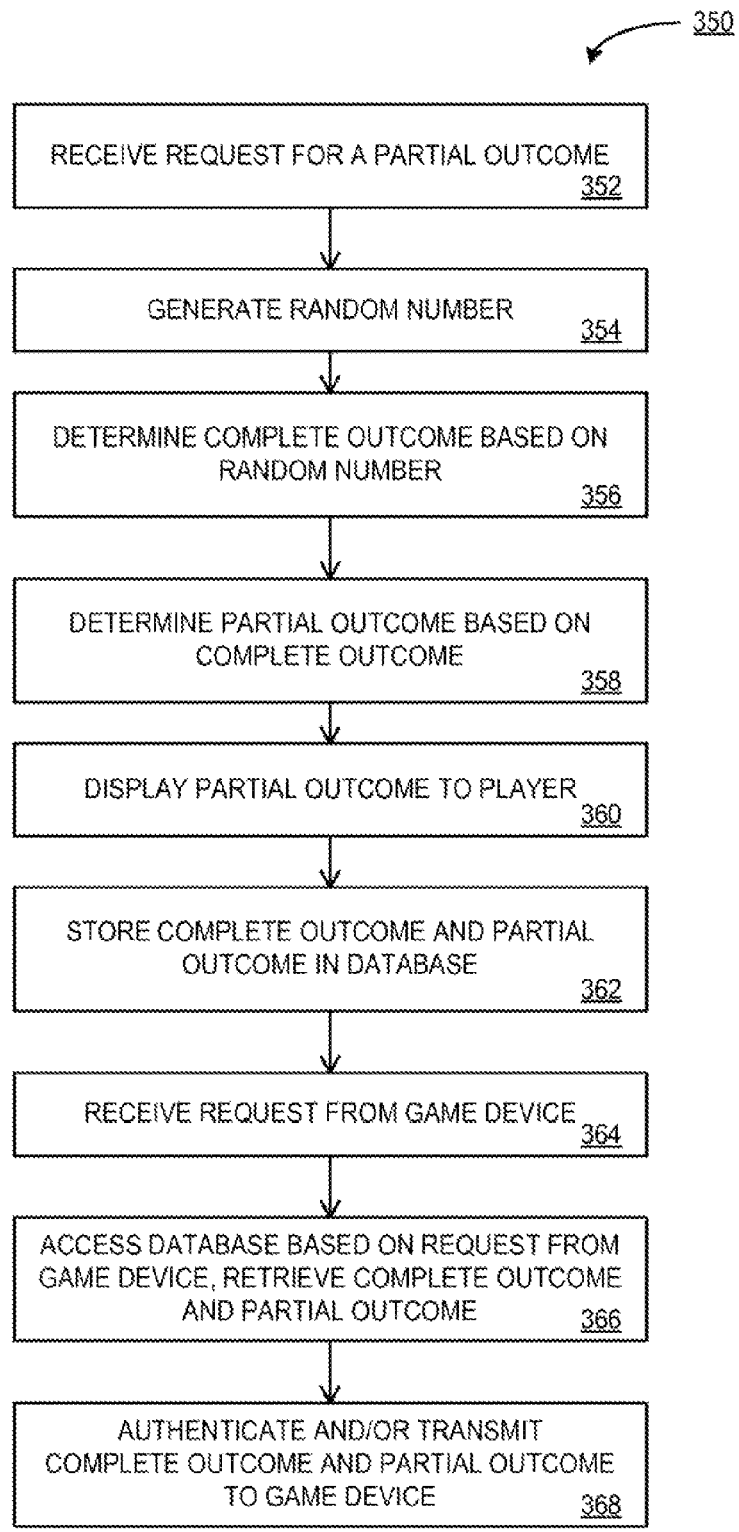
FIG. 3D illustrates another embodiment of a process for determining partial outcomes and displaying them to a player in accordance with the invention.

FIG. 3D illustrates another example process 350 for determining partial outcomes and displaying them to a player. This example process 350 includes receiving a request for a partial game outcome 352 from a player, generating a random number 354, and then determining a complete game outcome 356 based on the random number. Next, the partial game outcome is determined based on the complete outcome 358, and the partial outcome is displayed 360 to the player. Thus, in this implementation, the complete game outcomes and the partial game outcomes are generated at the same time, by the same device. For example, a complete outcome such as "Jackpot-Jackpot-Bell" may be determined based on the random number, but in such a case only the icons representing the first two reels ("Jackpot-Jackpot-?"), which represent a partial game outcome, are displayed to the player. The process 350 also includes storing the complete game outcome and the partial game outcome 362 in a database, receiving a request from a gaming device 364, and accessing the database based on the request and retrieving the partial game outcome and the complete game outcome 366. In addition, the partial game outcome is authenticated and/or transmitted 368 to the game device.

FIG. 3E illustrates a complete game outcome and partial game outcome database 370 that may be used in association with the process 350 of FIG. 3D. In particular, the database 370 includes a random numbers column 372, a complete game outcome column 374, a partial game outcome column 376, and a partial outcomes identifier column 378. Accordingly, when a request is received from a player using a remote device to generate partial outcomes, a random number is generated and then used to first determine a complete game outcome, then the partial game outcome is determined based on the complete game outcome, and a partial outcome identifier from column 378 is assigned. For example, if a random number of "174" is generated, then the random number column 372 is consulted and the complete game outcome "Bell-Bell-Cherry" is found. Accordingly, the associated partial game outcome "Bell-Bell-?" (see column 376) is displayed to the player. A partial outcome identifier of "PO-00000638" is also assigned. In another example, if a random number of "1207" is generated, then according to the random number column 372 the corresponding complete game outcome is "Cherry-Cherry-Cherry". Accordingly, the associated partial game outcome "Cherry-Cherry-?" is displayed (see column 376) to the player, and a partial outcome identifier of PO-000008 is assigned. If a random number of "9892" was generated instead, then the random number column 372 indicates that the partial outcome is "Partial Non-Win", which means that any non-winning combination may be displayed to the player (as explained above, any non-winning combination such as "Bell-Bar-?" or "Jackpot-Cherry-?" could be displayed, because based on the definition of the slot machine game being played, there are no third reel outcomes that could turn such combinations into winning combinations). In this case, a partial outcome identifier of "PO-00000N" is also assigned.

In some embodiments, there is no charge for a player to request partial outcomes (for example, by using his home computer), but a wager in the legalized gambling jurisdiction is required from the player (i.e., a minimum required amount of money must be inserted into a gaming device in the casino) before the complete outcome is output. For example, a casino might offer a "First Two Reels are Free Online!" program, whereby players visit a Web site maintained by the casino, and spin a virtual three-reel slot machine. For each spin the player executes, two of the three slot reels may resolve, while a third reel remains unresolved (e.g., a partial outcome of "Bar-Bar-?" is randomly determined). The player's partial results may be stored (e.g., a server at a casino stores "partial outcome identifiers" in association with a player identifier). Thus, the player may then visit the casino, place a wager, and one or more of his partial outcomes may be determined (e.g., the player inserts a player tracking card, inserts a wager, and requests an option of "Redeem my partial results," such that the partial results are accessed from the server).

For example, a player enters a casino and sits in front of a "Big Jackpot" slot machine, inserts his player card and is presented with a menu on the gaming device display (which may be a touch screen) that includes a touch-sensitive button labeled "access my partial results". The player may use this button to access partial results from one or more "head start" sessions that the player previously requested and received using his personal computer at home. Alternately, the player may push a different touch-sensitive button labeled "standard play" to choose and initiate a standard gaming session on the "Big Jackpot" gaming device, wherein a wager must first be inserted before the player is able to spin the reels. But if the player uses the touch screen to choose "access my partial results", a Web server may be contacted and may determine if the player is entitled to at least one complete game outcome. In an embodiment, a player identification from the player card is transmitted to the Web server and used to determine if the player obtained at least one partial game outcome at a remote device (for example, he played at least one "head start" session on his personal computer). If the player is entitled to at least one complete game outcome, then a list of partial outcome(s) may be displayed on the gaming device display screen so that the player may choose which of the partial outcomes he'd like to complete. After the player makes one or more selections, another prompt may be presented indicating that the player must insert a wager (or wagers) so that a complete game outcome associated with each partial game outcome can be determined. For example, if the player chose the partial result "Bar-Bar-?" for completion, then after inserting a wager, the complete result may be randomly determined by the gaming device to be "Bar-Bar-Plum", and this result is then displayed to the player. Other results, such as "Bar-Bar-Bell" are also possible, and also would be displayed to the player. If any particular complete game outcome is associated with a winning outcome, then the player is provided with a benefit such as a payout (which may be based on a paytable associated with the "Big Jackpot" gaming device, and/or which may be at least partially based on data in a "partial results achieved" database).

In some embodiments, a player may request one or more "head start" sessions that each includes a plurality of partial outcomes for a wagering game, and the request may originate in a legalized gambling jurisdiction (for example, from a personal computer located in a private home in Las Vegas, Nev.). After an hour of collecting the partial outcomes, the player may decide to review them for ten minutes, and then chooses which of the partial outcomes that she would like to bet on. The player may then place a wager on each of the partial outcomes for which a complete outcome is desired, and in such legalized gambling jurisdictions, she may be provided with the complete outcomes for here selected partial outcomes to the same personal computer. In such an implementation, the player may be permitted to charge any wagers to a pre-existing player account, or to a personal credit card account. In another implementation, the player may request a partial outcome for a wagering game by using her home computer in the legalized gambling jurisdiction, but then be required to go to the casino to both place a wager and to utilize a "partial outcome redemption" gaming device to obtain any desired complete outcomes.

In some implementations, partial outcomes that were obtained by a player using a remote device may later be released or "unlocked" based on a player's gaming activities at a casino. Such operation may be particularly applicable to positive expected value (EV) completion (to avoid the casino losing money), but is also possible for neutral EV completion (for entertainment purposes). For example, a player may be required to operate a game machine for 30 minutes before unlocking a code (or unlocking that game machine) that can then be used to obtain a complete outcome for a partial outcome that he generated online. In another example, partial outcomes may be unlocked to help a player get through cold streaks on a game machine. For example, if the player loses ten spins of a slot machine in a row, then three partial outcomes which he generated previously by using a personal computer the night before his casino visit may be unlocked so that the player is provided with additional chances to win, wherein the partial game outcomes may be associated with a higher expected value than his previous standard play on that slot machine. Certain factors may be considered to unlock partial outcomes so that a player can obtain complete game outcomes, which may include the duration of gaming, the money spent by the player, the amount of comp points earned by the player, and the current win/loss streak of the player.

Numerous manners of determining such complete outcomes in association with partial outcomes are contemplated. One way of segregating the manner in which partial outcomes are resolved is by considering the functionality of a device within the casino that the player utilizes to "complete" the partial outcomes. For example, in some embodiments, a gaming device within a casino may accommodate both "standard" play and "partial outcome completion" play, and such a dual gaming device could be used by a player for both regular play and to complete any partial outcomes that the player generated.

In one embodiment, a slot machine may provide the same "expected value" (EV), which is the sum of the probability multiplied by the payout for each outcome of all possible outcomes [sum of probability×payout for each outcome], regardless of whether a player is executing a standard game play or completing a partial outcome game play. For example, in either case, the machine may be programmed to provide an average payback of 95¢ for every $1 wagered (for example, a standard player wagers $1 and wins 95¢ on average, and thus a player completing partial outcome game play pays a $1 "completion fee" and wins 95¢ on average, and the like). Various methods to facilitate such operation are described, but generally, it may be accomplished by providing different payouts for, and/or different probabilities of, achieving certain outcomes when they are achieved via "partial outcome completion" or standard play (in particular, different paytables may be used for standard players and for remote players). Such embodiments may be considered advantageous because the partial results provided remotely may not bestow any more or less expected value to an online player redeeming the partial results than that afforded to a standard player. Accordingly, the less influence the online game may have over the ultimate result or the value provided to the player, the further such a program may be from violating Internet gambling laws that may apply in various jurisdictions (for example, even though a player gets "Jackpot-Jackpot-?" online, his redemption of the partial outcome yields the same EV as any standard game play, as the probability of, and/or the payout for, achieving "Jackpot-Jackpot-?" are adjusted).

In some embodiments, players visiting a casino may utilize separate, dedicated gaming devices that facilitate only partial outcome redemption (and do not provide standard play). In one such embodiment, players redeeming partial outcomes may be provided with a positive expected value (EV) (although neutral and negative EV provisions are contemplated). For example, it may cost a player a fee of $1 to complete a partial outcome achieved online. However, when completing the partial outcome, the player may achieve an average payout of more than $1 (for example, an average payout of $1.25). Thus, the redemption of partial outcomes may be considered a "positive EV" exchange for a player. It is recognized that casinos would find it difficult to remain profitable if they were they to offer such positive EV to all their players. However, casinos may be willing to offer such a positive EV to certain types of players (e.g., players in target demographics, prospective players, and the like), or to offer such a positive EV for a limited time (for example, for promotional purposes, and/or to introduce players to a new gaming device, and/or to encourage players to visit a casino at certain times of day or on certain days of the week). Thus, in one example, a positive EV may be provided to players through an online partial outcome program, and the casino may be happy to write the cost off for the positive EV games as marketing expense, perhaps charged to a "customer acquisition budget" or the like. Additionally, a casino might gain revenue from administering a partial outcomes Website by pushing advertising online.

A Website may be provided for players to navigate to and select one or more wagering games for obtaining partial outcomes. Casino operators could utilize such Websites to provide a means for players to set up preferred games, bets and payouts, and even to "play for free online" (for example, with "head starts" for video poker sessions, slot machine sessions, and the like), building customer loyalty in the process. A network-based Internet pre-play application may be used to interface with the Website service to pick up where the players left off once these players visit the casino to complete their "head-start" games. Fees could be imposed, for example, for twenty dollars ($20) per month, a player may play an unlimited number of "head start" sessions online, and be able to use advanced customization functions and other online services. Other pricing structures could also be used, for example, to encourage play of a particular type of game. For example, in an implementation a player visits a Website and plays a free "head start" session that lasts for twenty (20) spins, and if the player achieves a credit balance over a predetermined threshold, then the player can start a "Guaranteed Play™" session within the casino at that threshold.

In another embodiment, Website features are provided that allow the player to customize his entire casino visit before going to the casino location, for example, by customizing the characteristics of a slot machine game such as its look and feel (for example, setting the color scheme and/or the design patterns and/or the theme of a game), and/or by customizing the payouts of the slot machine, and/or by indicating the types of marketing offers he would be interested in reviewing, and/or by making reservations for dinner and/or a show. In addition, in some embodiments loyalty points may be awarded to a player for playing a certain amount of "head start" sessions online, and such loyalty points may only be redeemable at the casino location (exchangeable for various products and/or services and/or for discounts on entertainment or other services, for example).

Players may be attracted to use such a Website to be afforded with the opportunity to "play for free" online, and/or to establish one or more "head start" sessions in preparation for a casino visit, and to receive real value as a result. They may also use such a Website to play their favorite games during downtime at home or in the office, and then show up at the casino with real value already in hand, and with game settings tailored to their preferences. The casino builds loyalty by prolonging a player's interaction with the casino beyond the time the player spends on the casino floor, and also may use the Website for additional marketing and sponsorship opportunities.

A. Determining a Partial Outcome

In an embodiment, the device that determines partial outcomes is a server computer. For example, a computer server within a casino determines partial outcomes and transmits them to one or more remote gaming devices. In an embodiment, a first server within the casino determines partial outcomes, and transmits the partial outcomes to a second server within a casino, which stores indications of the partial outcomes. The stored partial outcomes are accessed from the second server by a remote gaming device.

A player may use a remote viewing device, such as a wireless handheld gaming device, including hardware and/or software configured to determine a partial outcome. In another embodiment, the player downloads a software application from the Internet onto his personal computer, and the software application determines the partial outcome. In yet another embodiment, a gaming device within a casino determines a partial outcome and transmits the partial outcome to a Web server, so that the partial outcome may be viewed online.

A partial outcome may be determined in various ways. For example, the partial outcome may be predetermined (that is, non-random). For example, a matrix of predetermined partial outcomes may be stored electronically (e.g., in a database of a Web server). The stored partial outcomes may then be selected and/or distributed for viewing and/or output in a predetermined, non-random manner (e.g., the "next" partial outcome in a predetermined sequence of partial outcomes is output in response to a request for a partial outcome). Predetermined partial results may be beneficial because operators or providers of partial outcomes may be able to arrange the partial outcomes in a manner that provides excitement to players. For example, a partial outcome matrix may contain many "near wins" or "potentially winning partial outcomes" (e.g., a large percentage of "Bar-Bar-?" or "7-7-?" partial outcomes, wherein the question mark ("?") represents a missing icon and/or symbol required to provide a complete outcome). Such close, potentially winning partial outcomes or "near wins" may be disbursed or allocated by a casino or other entity in a manner that is exciting to players. For example, near wins may be spread out evenly, or "Big" near wins ("Jackpot-Jackpot-Jackpot") may appear at the end of a sequence.

For example, while visiting a casino in a legalized gambling jurisdiction, a player purchases a "head start" session that includes a "batch" of 100 partial outcomes, which are pulled from a predetermined matrix (for example, a database) and stored on a wireless or handheld viewing device. (In one example, the device is "cradled" at a booth in a casino and the partial outcome data is transferred to the device from the server). The device then provides partial outcomes in sequence each time a player requests a spin. In another example, a Web server stores numerous predetermined partial outcomes (which may be stored in batches or groups). A player uses a Web-based application resident on a home personal computer (PC) that prompts the player to press a "spin" button, and when the player does so, the "next" partial outcome (e.g., of all stored partial outcomes of a "master" matrix, or of a "batch" of partial outcomes associated with the player, etc.) is pulled from the server and displayed to the player. In this example, the player may be permitted to purchase a "head start" session online because the player resides in a legalized gambling jurisdiction (which may or may not include the location of the Web server which generates the partial outcomes). In yet another example, a computer generates large numbers of partial outcomes and prints them onto paper, cardstock, or plastic. Such partial outcome cards may be distributed to players through a bricks-and-mortar marketing channel (e.g., mailed out to players who reside in a legalized gambling jurisdiction as part of a promotion, or given to players for free as the players enter the casino, or handed out at retail establishments such as supermarkets or gas stations located in a legalized gambling jurisdiction). Other means of distributing partial outcomes (or "head start" sessions) are contemplated, including providing partial outcomes online, and could be used so long as any and all laws and regulations that govern gambling are followed.

In an implementation, a player may request one or more partial outcomes by using a designated "Partial Game Outcome" kiosk. For example, a player may be permitted to insert his player card, or TITO ticket, or some other form of identification, into a partial game outcome kiosk and obtain a predetermined number (for example, fifty) partial outcomes of a wagering game, such as "Big Jackpot" video slots. The kiosk may display each partial outcome to the player, and may also display the possible winning combinations, prizes and/or dollar amounts per wager that the player could win if he is lucky enough to obtain a complete game outcome that results in a winning outcome. The kiosk may also be configured to output a TITO ticket, code, or other form of session identifier to the player for later use with a gaming device to access the partial game outcomes. In particular, the player may input the TITO ticket, code or other form of identifier to a gaming device on the casino floor request partial game completion (alternately, the player may only need to insert his player card to access the partial game results that are eligible for completion). Next, as explained above, the player may be presented by the gaming device with a display of his partial game outcomes in the order in which they were originally provided, so that the player can select which one(s) to complete. The gaming device may then prompt the player to insert a wager before providing one or more complete game results to the player. If any particular complete game result corresponds to a winning outcome, then the player is provided with a benefit, such as a payout (for example, a coin payout, or a cashless gaming ticket, or a coupon, or any other type of token that is exchangeable for cash, or a token that otherwise has value).

In an embodiment, a player may select his own outcome. For example, a player uses a mouse to click on a Web page and to indicate that he wants the first two reels to be Jackpot-Jackpot. Such an embodiment is especially applicable for neutral expected value implementations, and for embodiments in which a player unlocks a partial outcome (which will be explained below). In another example, a player at a slot machine could reach up and move the physical reels on the slot machine. In yet another example, a player continues to spin reels online until he receives one or more satisfactory partial outcomes. The player can then "save" the satisfactory outcomes for completion at a gaming device located in a casino.

In some embodiments, a player may only be allowed to spin and/or save a limited number of partial outcomes. For example, much like a standard gaming device, a device may generate a random result for the player, one or more of the aforementioned devices (e.g., server, remote gaming device) may generate a random number (e.g., within a predetermined range of random numbers), and compare the random number to a table of partial outcomes to determine a partial outcome.

In some embodiments, randomly determining a partial outcome may include determining a game type for which the partial outcomes will be determined. A player chooses a particular game by using a menu screen of a Web site to select the game that he would like to play and for which he desires partial outcomes. For example, a "Select your game" screen of a Web site offers a variety of Macromedia Flash™ games, and a player selects "Big Jackpot Slots". In some embodiments, the game type is predetermined or standard. For example, the player uses a television and interface available in a hotel room to select a "Head Start Gaming" option, and partial outcomes are then available for only one type of stud poker game. In another example, a player purchases a block of 100 partial outcomes of a "Magic Martians" slot game. The partial outcomes are provided on a DVD, which the player can then watch at his leisure.

In other embodiments a pay table is associated with a game type, and the pay table may correlate one or more random numbers to partial outcomes. For example, if different games are available for play remotely, different pay tables may be stored for each game type. The proper pay table may then be determined based on whichever game is selected by the player. For example, if a player selects a "Magic Martians" slot game, an appropriate table correlating random number ranges to partial outcomes of the game is accessed. In another example, the player uses a Web interface to select a game type. The Web server located in a casino contains stored "partial outcome tables" for various game types. The appropriate pay table is the selected from the stored pay tables.

In some embodiments, a random number is generated, and then a partial outcome is determined. Such operation will be described in more detail below, but in general, a processor generates a random number within a range, and the generated random number corresponds to the partial outcome (e.g., the random number 198738973 equals "Bell-Bell"). Generating the random number may comprise determining "partial outcome data," and may be used to determine other potentially relevant information such as a "partial outcome paytable," a "partial outcome ID," and the like, which is described in detail below.

Some embodiments employ a gaming device to facilitate standard play and partial outcome completion in association with a "Neutral Expected Value" aspect. In some embodiments, a gaming device within a casino may be available for both "standard" play and "completion" of partial game outcomes, and such a gaming device may be referred to as a "dual mode" gaming device. For example, a "Big Jackpot Slot Machine" game may be available on a slot floor, offering standard players (those players who are wagering and playing the casino gaming machine in a legalized gambling jurisdiction) complete results such as "Bar-Lemon-Bell" and "Jackpot-Jackpot-Jackpot". Players may also visit a Web site and play the "Big Jackpot Slot Machine" game and receive partial outcomes, such as "Bar-Lemon" and "Jackpot-Jackpot." Thus, in some embodiments, the same set of complete outcomes may be available to both the standard players and the players who redeem partial outcomes. For example, a remote player requests partial outcome (e.g., uses mouse to click "spin" button depicted by Web interface) in association with a particular game. A random number is then generated (e.g., by a casino server) and a partial outcome is determined based on the random number.

FIG. 4A is an example of a "standard play and partial outcome paytable" 400 that may be utilized in association with a type of game to determine both partial outcomes and completed outcomes. In particular, the standard play paytable portion 410 includes data stored in a random numbers column 415, outcome identifier column 420, complete outcome column 425, probability of complete outcome column 430, payout column 435, and expected value column 440. The partial outcome paytable portion 450 includes data stored in a random number column 455, a partial outcomes column 460, a partial outcomes identifier column 465 and a completion paytable column 470.

Such a "standard play and partial outcome paytable" 400 for the "Big Jackpot Slot Machine" 405 may be stored by any or all of a gaming device, a server, and a remote gaming device. The paytable 400 includes a standard play paytable 410 may be used for standard play. For example, when a player walks up to "Big Jackpot" slot machine located in a casino, posts a wager, and presses a spin button. If, in response to the pressing of the spin button, the processor generates a random number of 96, then the outcome is determined by looking up various data found in the columns of the standard play paytable 410. In this case, the random number 96 falls within a range of random numbers as shown in column 415 that has an outcome ID 420 of "O-000005", which corresponds to the complete outcome of "Bell-Bell-Bell" (see complete outcome column 425). The complete outcome "Bell-Bell-Bell" is displayed to the player and the player is also provided with a payout of 100 coins (see payout column 435). This particular outcome has an Expected Value (EV) of 0.075 (see entry corresponding to random number 96 in the EV column 440), whereas any one standard game play of this type of slot machine game ("Big Jackpot Slot Machine" 405) results in an EV 475 of "0.9625" to be provided to the player over time. This overall EV means that, in the long run, the paytable 400 is constructed to give 96.25% of a player's wagers back to the player in the form of payouts.

The "standard play and partial outcome paytable" 400 may also be used to randomly determine a partial outcome for a player. For example, in response to a player request for generating a partial outcome, a random number "168" is generated by any of the above-described devices (e.g., a server, a remote gaming device). The partial outcome paytable 450 is then used to determine that the random number 168 corresponds to a partial outcome of "Bell-Bell" (see partial outcome column 460).

The "standard play and partial outcome paytable" 400 could alternately be represented as two different tables. However, the data is presented as shown in the present example to emphasize that the same ranges of random numbers may be utilized to determine complete outcomes for standard play and to determine partial outcomes for remote play.

It is recognized that an important consideration with respect to "EV-neutral" embodiments concerns making the online game feel valuable or "worth playing," even though standard game players of the gaming device and players utilizing the same (or a similar) gaming device to redeem partial outcomes receive the same completed outcomes. Thus, if online players (i) receive partial outcomes with a frequency that resonates with respect to how often they might receive associated complete outcomes of the same game within a casino (e.g., the online program doesn't "just give them a bunch of losing partial outcomes"), and (ii) were able to attain the same payout amounts for completing partial outcomes (e.g., a partial outcome of "Bell-Bell" becomes "Bell-Bell-Bell" and pays 100 coins) as standard players would for achieving the same outcomes (100 coins are paid to a "walk-up" player to simply spin the reels of the standard play game device and attains "Bell-Bell-Bell"). As will be described further herein, the probabilities may be adjusted for partial outcome completion, via a separate completion paytable, so that a 100-coin payout can be provided for "Bell-Bell-Bell" while maintaining a neutral overall EV. Consequently, the online game may feel more like a true "preview" or "portion" of a real game occurring within a casino, which offers legal payouts, and less like a separate program (which players may deprecate, even if unreasonably, as having a lesser value).

In some embodiments, players may play an online game from a location that does not permit gambling, receive partial outcomes, and then "complete" the outcomes at a gaming device within a casino in a legalized gambling jurisdiction. In such an embodiment, a gaming device may be operable only to facilitate partial outcome completion (and not facilitate standard play). For example, a "Partial Outcome Redemption Machine" (for example, branded as a "Win From Home" machine) may be positioned on a casino floor. Since such a machine cannot also be used to facilitate standard local play, an online partial outcome program may not be limited by the aforementioned concerns of making the online portion feel like a way to get a "head start" on a traditional slot machine. Instead, the "Partial Outcome Redemption Machine" may simply be offered as an "extra" game only available to players who first start the game online. As described herein, in some embodiments, players may be offered a "positive EV" (a fee players are charged to redeem partial outcomes is less than the average amount they are paid out), with the extra cost to the casino justified by attracting new business (i.e., new players) via the online program. However, such embodiments may be facilitated using a "neutral" or even "negative" EV (e.g., players receive partial outcomes for free online, and then must spend $1 to redeem each, but receive only 90¢ in return per outcome as part of a built-in house edge).

In some embodiments, determining a partial outcome for a player may also include determining "partial outcome data" (further data). For example, based on a random number, one or more types of data may be determined (and, in some embodiments, stored with a player identifier or account identifier). Referring to FIG. 4A, if a random number of 168 is generated, then the partial outcome is "Bell-Bell" (see random number column 455 and corresponding entry in partial outcome column 460), and a partial outcome identifier of PO-000003 is determined (see corresponding entry in partial outcome ID column 465). Such an "Identifier" may comprise a series of characters (e.g., numeric, alphanumeric) or a "code" that may be stored and later read and/or understood to mean a particular partial outcome. In addition, using the same example of a random number of 168 and a partial outcome of "Bell-Bell," an associated "Completion paytable" PT-000005 may be determined (see corresponding entry in Completion Paytable column 470). The "Completion paytable," described further below, may be a paytable that could be utilized when a player requests a "completion" of a particular partial outcome at a gaming device within a legal jurisdiction. In some embodiments, separate "completion paytables" may be stored for each type of partial outcome a player may receive remotely, such that appropriate complete outcomes may be determined. For example, a player receives a partial outcome of "Bell-Bell" online, and when visiting a casino to complete the partial outcome, a completion paytable is accessed that yields a plurality of results that each includes "Bell-Bell" as the first two symbols. An indication of this completion paytable may be stored.

In some embodiments, an associated "complete outcome" may be determined before a player visits a casino (and just not shown to the player until he requests "completion" of a partial outcome). For example, a random number is determined, and based on the random number, (i) a partial outcome is determined and output, and (ii) a complete outcome is determined and stored in a database such that it later may be output to the player (e.g., at the casino). In an embodiment, cryptography is used to obfuscate and later reveal the outcome in a manner that makes it trustworthy to the player. In other embodiments, a complete outcome may be based at least partially on historic results from a physical gaming device, and may be "uploaded" and/or repurposed to a Website.

B. Outputting the Partial Outcome

In an embodiment, a partial outcome is output based to a player upon the request of the player. For example, the player uses a mouse connected to his home PC to click on a graphical "spin" button presented by an online gaming application, or the player presses "spin" button of wireless handheld device. In another example, a player pre-purchases 100 partial outcomes, and once he begins viewing them, one partial outcome is automatically output every five seconds until the partial outcomes conclude. For example, a DVD chapter depicts 100 partial outcomes being output in sequence, or a player uses a hotel room TV remote control to "play," "pause," and "fast forward" partial outcome presentations. Other triggers for receiving partial outcomes are possible. For example, a trigger for receiving partial outcomes may include the player booking a hotel room online, or may be based on the player's location (for example, the player enters the casino, the player enters or exits his hotel room, and/or the player arrives in Las Vegas airport). Such a triggering process may include determining a player's location based on a signal transmitted by the player's cell phone or other device (for example, a GPS device transmits the player's coordinates, an E-911 call provides a location, and/or a location-based wireless service provides a location).

Partial outcomes may be output by one or more output devices of a remote gaming device. For example, partial outcomes may be displayed on a monitor, and/or through the speakers of a personal computer (PC). In an implementation, a media file depicting slot spin accessed from a Web server is output to the PC. In another implementation, a player downloads, or loads from a CD-ROM, an executable software application for viewing partial results. When run, the software application provides a media file depicting a slot spin. The partial results may be displayed, for example, on a display screen of handheld gaming device, on a screen of a cellular phone which receives transmission of a partial outcome, and/or on a television (possibly from partial outcomes stored on DVD).

In addition to partial outcomes being displayed, an indication or display of the types of complete outcomes and the odds associated with such outcomes, and/or an indication of the types of prizes the player could win, may also be displayed for the player. Thus, the prizes and/or payouts along with the probability of obtaining such results for a given partial outcome or group of partial outcomes may be displayed, so that the player can determine what she could win. For example, if a partial outcome of "Bell-Bell-?" is output, the display may include this partial outcome plus a table that includes all possible winning completed outcomes such as: "Bell-Bell-Bell", "Bell-Bell-Plum", "Bell-Bell-Bar", "Bell-Bell-Orange", and "Bell-Bell-7", along with the odds for obtaining each of these outcomes, and the prize (or payout) associated with each one. For example, the odds of obtaining a "Bell-Bell-Bell" complete outcome may be 1000 to 1, and the payout may be $950 for a one dollar wager, whereas the odds of obtaining a "Bell-Bell-7" completed outcome may be 15 to 1 and have a corresponding payout of $13 for each dollar wagered. It is contemplated that, in some embodiments, such information along with other information desired by players could be displayed along with the partial outcomes.

Static or dynamic partial outcomes may be output. For example, a static output may be out to a cellular phone which provides a display of still graphical sets of two slot symbols without animation. Alternately, a dynamic output may be provided. For example, an audio/visual media file may be transmitted to a remote gaming device that displays an animated partial outcome event.

Different types of partial outcomes may be provided. For example, two out of three slot symbols, such as "Bar-Bar-?" or "Bar-?-Bar" or "?-Bar-Bar" could be provided, wherein the question mark "?" symbol is a placeholder for a missing slot symbol needed to complete the outcome. In another embodiment, three out of five slot symbols are provided, such as "Bell-7-Plum-?-?" or "Bell-Mystery-Bell-Mystery-Bell". Blank spaces, "mystery" symbols, question marks, and the like could all be used as placeholders to indicating any missing, yet to be determined symbols. Partial outcomes of other types of games could also be used. For example, a Video Poker partial outcome may include three out of five cards, such as: "A hearts-Q hearts-K spades-?-?". Similarly, a Blackjack partial outcome may include dealing a "first player card" and a "dealer up card" of the video Blackjack game. For example, in a table or video Blackjack game, a player gets "his" total ahead of visiting the physical gaming table at the casino, but does not get to see the dealer's total until arriving at the casino. For Video Roulette, a first "digit" of the space where a virtual ball will land may be output, for example, a "0" for an outcome of "07" or "00", or a "1" for an outcome of "13" or "19" (that is, a first outcome of a two-ball roulette table). Accordingly, "unknown" or as yet determined indicia may be expressed in a partial outcome output as, for example, blank spaces, "Un-spun" reels and/or "perpetually spinning until resolved" reels, question marks. "Mystery" symbols, Blurred symbols, Encrypted symbols (nonsensical code), and the like.

C. Store Data to Associate a Partial Outcome with a Player or Account Identifier FIG. 5 illustrates a "Partial Results Achieved Database" 500 that may be maintained by a casino server and/or a remote gaming device. For example, the partial outcome data may be electronically stored in volatile or non-volatile memory. The database 500 is associated with a particular player and includes identification data such as a player identifier 505 of "P-092983", a partial results session identifier 510 of "PRS-009291", and an expiration date 515 of Jan. 1, 2007. Also included are a "partial results number" column 520, a "partial result" column 525, a "partial result" ID 530, a "completion table" column 535, and a "completed" column 540. In this embodiment, partial results which are stored in column 525 are stored in association with a player identifier, but in some embodiments the partial results could be stored in association with other identifiers such as an account identifier, a partial results session identifier, and the like.

The player ID 505 is a code that identifies a specific player, and that is used to correlate one or more partial results achieved to that player. Alternately, or in addition, to the player ID, an "account ID" or other types of identifiers may be used. In the example database 505 of FIG. 5, one player ID is associated with a plurality of results. But in some embodiments, a "master partial results achieved" database might store results for all players of a particular type of wagering game. The rows of such a master partial results achieved database may indicate different "player IDs" that are associated with different partial results. In addition, a Partial Results Session ID may be used in place of, or in addition to, the player ID, and may be useful when players partake in a plurality of online sessions.

In some embodiments, a player may only have a limited timeframe to complete partial outcomes. For example, the player receives a set of partial outcomes online during a peak gaming weekend, and may be required to wait until the weekdays in order to complete the partial outcomes. In another example, a player receives one or more partial outcomes on day 1 and may not redeem the partial outcomes until day 2 (i.e., to encourage a repeat visit to a casino).

In some embodiments, the Partial Result Number 520 may indicate a sequence in which player achieved partial results, and may be used by the player to indicate specific partial results he would like to complete. For example, the player requests to redeem the partial result "#7" (number seven, which is associated with a partial result of "Jackpot-Jackpot").

The Partial Result 525 is an indication of the indicia presented to the player remotely. The Partial Result ID 530 may be an encoded version of that partial result. The Completion Paytable 535 number identifies a table that is associated with each partial outcome that may be used to determine a complete outcome. The Completion Paytable Number 535 would not be necessary for embodiments wherein complete outcomes are predetermined in advance of a player visit to the casino. Lastly, the "Completed?" column 540 indicates whether or not a partial outcome has been completed by the player. Data in column 540 may later be populated (e.g., with one "complete outcome" for each "partial result number")

once complete results are determined, and this column is not necessary in embodiments wherein complete outcomes are predetermined in advance of the player visiting the casino.

Other types of storage may be used to preserve such data (non-database or non-electronic). For example, any or all of the data shown in FIG. 5 may be encoded into a barcode of a paper substrate such as a "cashless gaming ticket" printed from a kiosk or by a home computer printer. Alternately or in addition, a magnetic stripe of a player tracking card could be swiped through a reader/writer of a remote gaming device and may store such data. Other personal electronic devices, such as a cell phone, PDA, iPod, and the like could be used, not only to obtain partial outcomes, but also to store them.

In some embodiments, players may have control over what partial outcome data is stored. For example, players may chose to "save" certain partial outcomes and "discard" others. Examples of how a player may indicate that one or more partial outcomes may be saved or stored include, but are not limited to, a player using a personal computer to view partial outcomes and, as each partial outcome is output, the player selects a "save" option to save the partial outcome, causing it to be stored in a database as above (or stored in memory of the computer such that a barcode may be printed based on the data stored in memory). In another example, the player utilizes a wireless handheld device at a casino resort pool to view partial outcomes. After he has completed viewing a batch of 100 partial outcomes, the player may sort through them and select which outcomes he'd like to save. The saved outcomes are then transmitted wirelessly to a server within the casino such that they may be accessed at a later time when a player goes to the slot floor, sits down at a gaming device, and wagers.

D. Identifying Partial Outcomes

In some embodiments, a player utilizes a gaming device within a casino to request the determination of a complete outcome in association with a partial game outcome that was obtained previously by the player. In an embodiment, the player utilizes a form of identification, such as a player tracking card, so that a query can be made to access partial game results from the partial game results achieved database. Other forms of identification may be used, for example, the player may insert a cashless gaming ticket (having a barcode that encodes the partial outcomes available for completion, or that is simply a "pointer" to a database record on the server), or the player enters a code (e.g., after finishing an online game and generating partial outcomes, the player is given the following directions: "Enter code 192830 into the keypad of any slot machine to complete your results at the casino".). Once an identifier is provided and the partial game outcomes are found in the database, one or more partial outcomes (or sets of partial outcomes) may be displayed to the player. The player may next be prompted to select one or more of the partial game outcomes to wager on, and thus to obtain complete game outcomes.

In another embodiment, a player utilizes a mobile or wireless device to request a complete outcome in association with a partial outcome. For example, the player may utilize a cell phone to request a complete outcome, if the player is physically located in a legalized gambling jurisdiction. In an embodiment, the player dials a predetermined number from a legalized gambling jurisdiction, and then selects "partial outcome redemption" from a menu that contains various options. For example, the player may use the existing operating system on his cell phone to review the partial outcomes and select one or more for complete outcomes, scroll through text messages, render a Java applet, and/or listen to a voicemail message regarding complete outcomes. The player is then able to obtain at least one completed outcome of the partial results that have already been achieved. It is contemplated that, in some embodiments, the same mobile or wireless device that was used to obtain the partial outcomes could be used to also obtain the completed outcomes.

In an embodiment, a player selects the partial results to complete from a set. For example, a touch-sensitive display screen depicts a set of partial results and the player "presses" the partial results he'd like to redeem. Next, the reels reconfigure to the appropriate first two symbols based on the player selection. In another implementation, the partial results are determined in a random fashion.

Partial game outcomes may be completed and displayed "in sequence" (i.e., in the same sequence or order as the partial outcomes were determined). For example, if the set is determined to be partial results session PRS-009291 (see FIG. 5, reference no. 510), a slot machine display screen first depicts the appropriate first two non-winning symbols of "partial result number 1" 525, such that when the player then presses a spin button (after placing a wager), the third reel is determined (for example, an animation sequence shows blurring reels top simulate a spinning action, and then the reels resolve to display a non-winning result). The reels are then reset to the first two symbols of "partial result number 2," and the process continues until all of the partial results have been completed.

In some embodiments, the player indicates the specific partial outcome to be redeemed without the set first being determined. For example, the player inserts a cashless gaming ticket "good for" one particular partial outcome, or the player enters a code entitling him to complete a particular partial outcome. In another embodiment, a cashless gaming ticket may provide the player with a plurality of partial outcomes that the player selected, or that includes all of his partial game outcomes, for use with a gaming device.

In some embodiments, a "fee" or a wager may be required to complete one or more partial outcomes. For example, a player may wager anything he'd like (e.g., if he wages zero coins, he wins zero coins; if he wagers one coin, he wins whatever a paytable indicates for a one-coin bet; if he wagers two coins, he wins whatever a paytable indicates for a two-coin bet; and the like). For example, the player may be required to provide a flat $1 "completion fee" per partial outcome. In another example, the player pre-pays a flat amount of $20 to receive 100 partial outcomes viewable online, which he may then redeem without further payment ("for free") at a casino. In yet another example, the player can only redeem partial outcomes after playing a certain amount of standard play wagering rounds (e.g., $10 must be wagered in standard play).

In some embodiments, restrictions may apply regarding when and/or where and/or how a partial outcome may be redeemed by a player. In particular, an expiration condition may apply. For example, a particular partial outcome may expires in one hour from when it is transmitted to the player. Such a time restriction encourages the player to stay near the casino, thereby generating additional business on casino property. In another example, a particular partial outcome may only be good at certain times of the day, such as during off-peak hours at the casino. Another restriction may involve the partial outcome only being good on certain game devices. For example, game devices that have been selected based on their low or high traffic locations in the casino, their hold percentages, and/or whether or not the game device is linked to progressive jackpots. In some embodiments, a player can only redeem a partial outcome on a game device if the player has established a certain predetermined credit balance on the game device.

In some embodiments, a player may postpone the expiration of a partial outcome by performing an activity. For example, a one hour expiration timer for validity of a partial outcome may be paused and/or postponed while a player is operating a gaming device on the casino floor (a casino does not want to force players away from a game that they like and are actively playing). In other embodiments, a player may postpone the expiration of a partial outcome for eight hours, for example, by making a predetermined minimum dollar amount purchase at a retail store associated with the casino. In some implementations, a player may postpone the expiration of a partial outcome indefinitely by making a forward commitment (for example, a forward commitment to gamble for at least one hour). In other implementations, the player may be permitted to spend comp points to postpone the expiration of a partial outcome. Thus, in some embodiments, a player may perform value-added casino activities (such as gaming, purchasing products from the casino gift shops, purchasing hotel services, and the like) in order to postpone the expiration of a partial outcome.

In the case of dual mode gaming devices that offer both Standard Play and Partial Outcome Redemption modes of operation, when a player requests to determine a complete outcome in association with a partial outcome, a player may first be prompted to select the "Partial Outcome" completion mode. For example, a gaming device in a casino may be configured to "default" to standard play mode when idle, but displays a menu that includes an option to "Complete My 'At Home' Spins," which the player may select to cause the gaming device to switch to a "completion mode" that enables completion of the partial outcomes that the player obtained previously.

E. Determining and Displaying Complete Outcomes

In some embodiments, a complete outcome in association with a partial outcome is based on the received request to determine the complete outcome. For example, a player may provide (i) a "partial results session ID" indicating a group of partial results he'd like to redeem, and/or (ii) a specific individual partial result ID. Data may then be accessed (from example, from a database stored by a server) based on an identified partial result the player would like to complete.

Figure 6A:
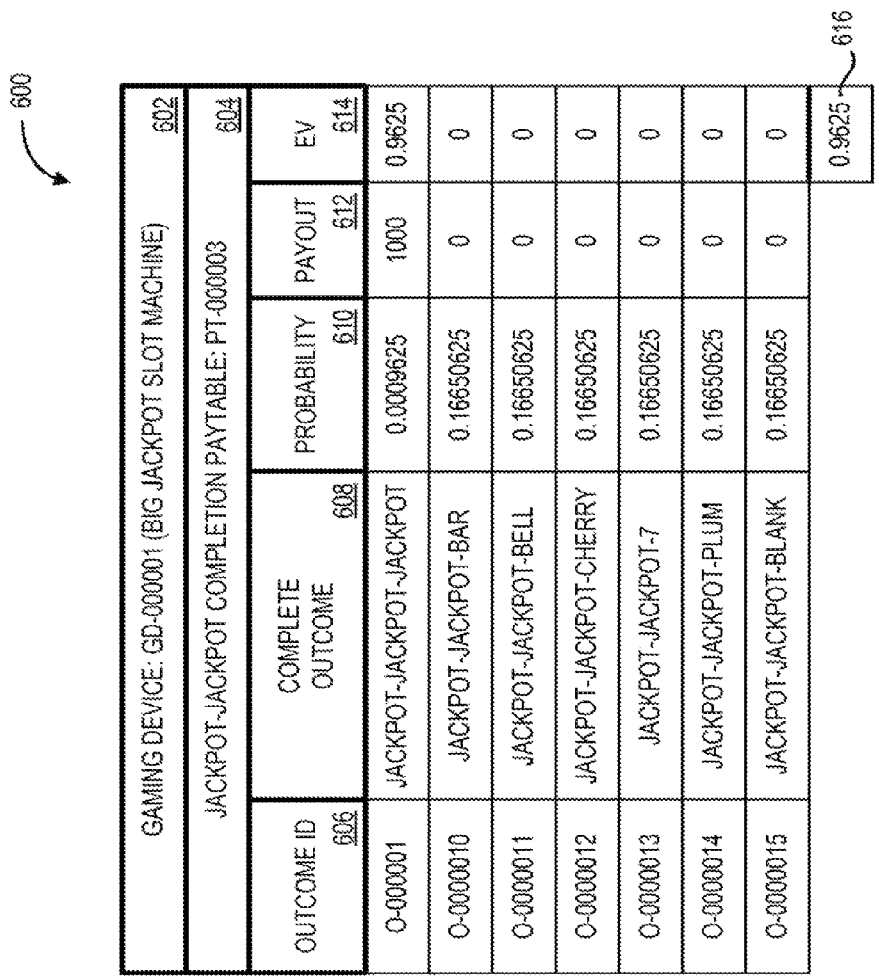
FIG. 6A illustrates a "Jackpot-Jackpot Completion Paytable" for a "Big Jackpot Slot Machine" operable to facilitate both standard play and partial outcome completion in accordance with an embodiment of the invention.

FIG. 6A illustrates a Completion Paytable 600 for a particular "Big Jackpot Slot Machine" (GD-000001) 602. The "Big Jackpot Slot Machine" GD-000001 is operable to facilitate both standard play and partial outcome completion, and FIG. 6A illustrates a "Jackpot-Jackpot Completion Paytable: PT-000003" 604, which is configured as a "Neutral EV" embodiment. The paytable 600 includes data entries for an Outcome ID column 606, a Complete Outcome column 608, a Probability column 610, a Payout column 612, and an EV column 614. In this embodiment, the total EV 616 is 0.9625.

For example, a player using the gaming device GD-0000001 may indicate that he'd like to redeem partial result #7 of partial results session PRS-009291 ("Jackpot-Jackpot"≤see reference numbers 510 and 520 of FIG. 5). Based on this information, the "partial results achieved database" 500 may be accessed, and it may be determined that a player is due one game play against completion paytable PT-000003 (shown in FIG. 6A). In some embodiments, a gaming device and/or server may store a plurality of such completion paytables. For example, one completion paytable for each type of partial outcome may be stored (e.g., one for "Jackpot-Jackpot," one for "Bar-Bar," one for "Bell-Bell," and the like; one for each type of non-winning combination (though for purposes of simplicity, all "non-winning" results and partial results have been lumped together).

In some embodiments, a random number may be generated (based on the probabilities indicated, as is known in the art), and an outcome of the completion paytable PT-000003 may be determined. With regard to the paytable 600 of FIG. 6A, only outcomes that begin with "Jackpot-Jackpot" (the partial outcome) are included in this specific completion paytable. In addition, a comparison to the "standard play paytable" of GD-000001 (See reference number 410 of FIG. 4A 5) reveals that a complete outcome of "Jackpot-Jackpot-Jackpot" pays 1000 coins if achieved in either standard play or by partial outcome and then completion (which makes the online program feel valuable—players can win "actual" or "real" payouts from gaming devices on the floor). Furthermore, in this example, the "Jackpot-Jackpot-Jackpot" outcome is more likely to be achieved when "completing" a partial outcome of "Jackpot-Jackpot" against the completion paytable (which has a probability of 0.0009625) than when simply playing the device through standard play (which has a probability of 0.00005). Having an increased probability of achieving "Jackpot-Jackpot-Jackpot" when presenting a partial outcome of "Jackpot-Jackpot" is likely to resonate well with players (e.g., "it only makes sense that you're more likely to get it").

It should be noted that the completion paytable 600 and the standard play paytable 410 each provides the same overall expected value per game play (0.9625). In other words, whether a player is using the slot machine to complete "Jackpot-Jackpot" or generate a new game play, he will statistically receive 96.25% of his wagers paid back as winnings over time. Thus, the gaming device is "EV-neutral" between standard play and partial outcome redemption. This may be beneficial for various reasons and/or considerations, including legality (e.g., the online program can't really be considered "gambling" if it has no ultimate affect on the monetary results players achieve). As shown in the completion paytable 600, the probability of achieving a non-winning result (0.9990375) is divided evenly among six types of non-winning outcomes. But such an even distribution need not necessarily be the case (e.g., if desired, Jackpot-Jackpot-7 may be programmed to be more likely than Jackpot-Jackpot-Bell).

Figure 6B:
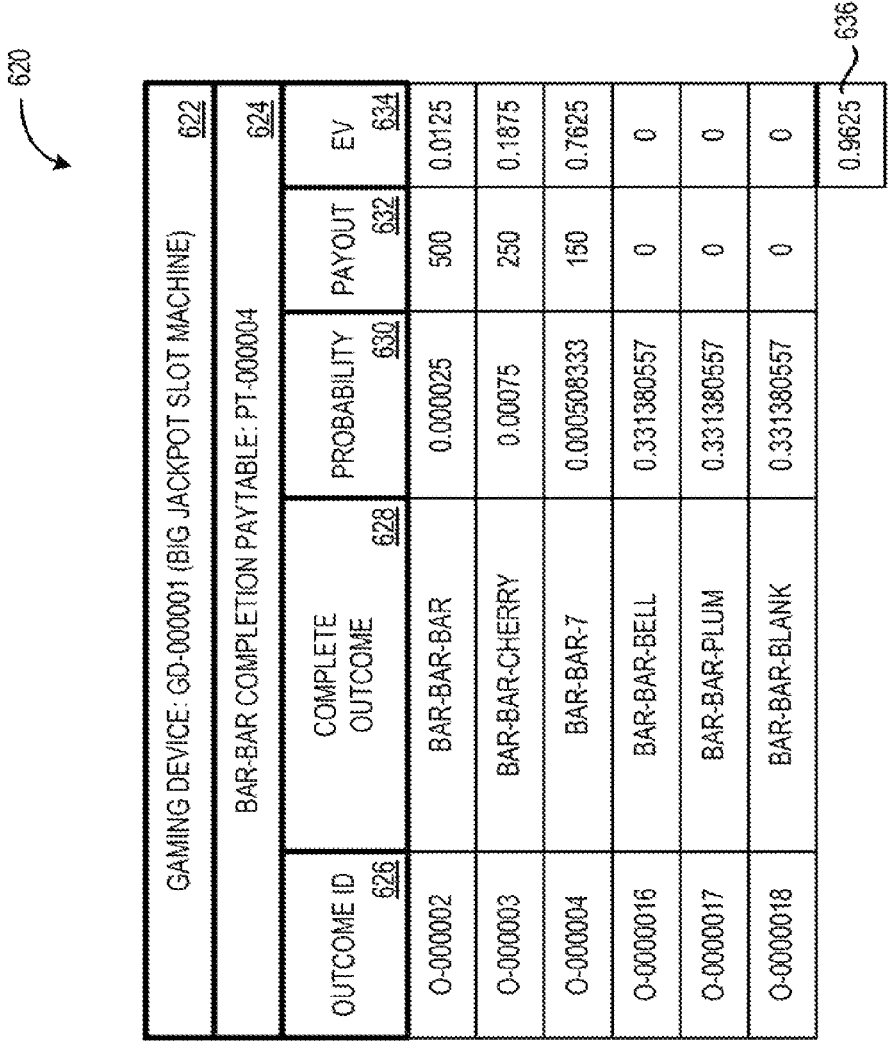
FIG. 6B illustrates a "Bar-Bar Completion Paytable" for a "Big Jackpot Slot Machine" for use in accordance with an embodiment of the invention.

FIG. 6B illustrates another embodiment of a Completion Paytable 620 for a "Big Jackpot Slot Machine" (GD-000001) 622. In this example, the "Big Jackpot Slot Machine" GD-000001 is associated with a "Jackpot-Jackpot Completion Paytable: PT-000004" 624. The paytable 620 includes data entries for an Outcome ID column 626, a Complete Outcome column 628, a Probability column 630, a Payout column 632, and an EV column 634. As in the example of FIG. 6A, the total EV 636 for the Completion Paytable 620 is 0.9625.

For example, if a player approaches the gaming device GD-000001 operable to facilitate both standard play and partial outcome completion (e.g., the "Big Jackpot" slot machine GD-000001), and indicates he'd like to redeem the partial outcome "Bar-Bar," then the completion paytable 620 of FIG. 6B may be used. Referring to FIG. 6B, a player may win different amounts of coins for outcomes of "Bar-Bar-Bar" (500 coins), "Bar-Bar-Cherry" (250 coins), and "Bar-Bar-7" (150 coins), irrespective of whether they present partial outcomes or not, although the probabilities of achieving such outcomes (and other non-winning outcomes) may be adjusted for players who are completing partial outcomes (as compared to a standard paytable).

FIG. 6C illustrates yet another embodiment of a Completion Paytable 640 for a "Big Jackpot Slot Machine" (GD- 000001) 642. In this example, the "Big Jackpot Slot Machine" GD-000001 is associated with a "Jackpot-Jackpot Completion Paytable: PT-000005" 644. The paytable 640 includes data entries for an Outcome ID column 646, a Complete Outcome column 648, a Probability column 650, a Payout column 652, and an EV column 654. FIG. 6C may be used when a player provides a partial outcome of "Bell-Bell". As in the examples of FIGS. 6A and 6B, the total EV 656 for the Completion Paytable 640 is 0.9625.

Similarly, FIG. 6D illustrates an embodiment of a Completion Paytable 660 for a "Big Jackpot Slot Machine" (GD-000001) 662 for use when a player provides a partial outcome of "Cherry-Cherry". In this example, the "Big Jackpot Slot Machine" GD-000001 is associated with a "Jackpot-Jackpot Completion Paytable: PT-00000" 664. The paytable 660 includes data entries for an Outcome ID column 666, a Complete Outcome column 668, a Probability column 670, a Payout column 672, and an EV column 674. As in the examples of FIGS. 6A, 6B and 6C, the total EV 656 for the Completion Paytable 660 is 0.9625.

Each of the example completion paytables shown in FIGS. 6A to 6D provides the same overall expected value (EV) per game play (0.9625). But of course, in alternate embodiments, a gaming device may provide a different overall EV depending on the game being played, for example. In some embodiments, a game device may be provided that facilitates both standard play and completion of partial outcomes, and which also provides a different overall EV to the different types of players. For example, a casino may promote online play by providing that: "online players get 10% extra payouts!" Such a promotional program may be funded by a casino's customer acquisition budget to bring new players to the casino floor.

In some embodiments, a particular type of gaming device facilitates only partial outcome redemption, and may be a "Positive EV" embodiment. For example, a gaming device within a casino may function only to complete partial outcomes that have been provided remotely. The process of determining a complete outcome in association with such presented partial outcomes may function in a manner similar to that of the embodiments described above. Thus, based on a partial outcome a player provides and desires to complete, a "completion paytable" may be determined (offering a subset of all results customarily available on the machine, the subset including all completed results featuring appropriate indicia in the appropriate positions corresponding to the partial outcome). In some embodiments, one or more of such completion paytables may offer the player a "positive EV" based on the wagers and/or fees that the player has posted (e.g., players wagering $1 on average will win back $1.25 in the long run).

FIG. 7 illustrates a "positive EV" completion paytable 700 for a gaming device GD-000002 ("Win From Home Slot Machine") 705, which is a "Jackpot-Jackpot Completion Paytable: PT2-000003" 710. The paytable 700 includes data entries for an Outcome ID column 715, a Complete Outcome column 720, a Probability column 725, a Payout column 730, and an EV column 735. FIG. 7 may be used when a player provides a partial outcome of "Jackpot-Jackpot", and illustrates that, in the long run, the player will receive $1.25 for every $1.00 wagered. As shown, the total EV 740 for the Completion Paytable 8100 is 1.25.

In some embodiments, only certain completion paytables of such a "completion-only" gaming device may offer a positive EV. For example, only the "winning completion" paytables (e.g., "Bar-Bar", "Bell-Bell", and the like) may offer a positive EV, while the non-winning tables do not. Thus, in some embodiments, partial outcomes that may potentially be completed as winning outcomes (e.g., "Bar-Bar", "Bell-Bell", and the like) may be more valuable for a player to achieve remotely than non-winning partial outcomes (e.g., "Bell-7", "Jackpot-Bar", etc.). Thus, in one embodiment, a program offering random remote determination of such partial results may offer the player a chance to win considerable value (which may be conceptualized as a coupon program). In some embodiments, a casino might advertise and/or market the benefits of such a program, in hopes of getting players to partake in the program and ultimately visit the casino. For example, as described, such a program may be thought of as a way to acquire new customers. A portion of a casino's budget may be dedicated to covering wins paid out to players through such a program. For example, Casino XYZ advertises: "Visit CasinoXYZ.com and spin the first two reels of our Win From Home' slots game online! When your first two reels feature matching symbols, you'll get 125% payback for coming to the casino to complete the third reel!"

In some embodiments, a gaming device may be used only to redeem and/or complete partial outcomes, but such a gaming device does so in a manner that offers a neutral or a negative EV (or payback) with respect to an amount that a player wagers. For example, players spend $1 to complete each partial outcome achieved online and win back $1 on average (neutral EV), or players may wager anywhere from 25¢ to $1.25 per "completion spin," and on average win back 95% of their wager amount (a negative EV).

In some embodiments, such a completion database may be updated to indicate that (i) specific partial outcomes have been completed (determined), and/or (ii) what the partial outcomes have been "completed to" (e.g., "Bar-Bar" became "Bar-Bar-7"). For example, referring to FIG. 5, for "Partial Result #10", a "Completed?" field 540 may be updated to indicate "Bar-Bar-7".

In some embodiments, it may be useful to prevent players from attempting to "complete" the same partial outcome twice. In such embodiments, a feature may be to include determining whether a particular partial outcome has already been completed, and if so, output a "sorry" message to the player.

In some embodiments, as described above, complete outcomes may be determined before a player visits a casino (and not shown to players until visit a gaming device located in the casino). Thus, in some embodiments, determining a complete outcome may includes accessing a database to determine a pre-stored complete outcome in association with a partial outcome that a player desires to redeem. In addition, such a process may include "decrypting" a predetermined complete outcome.

In some embodiments, complete outcomes may be determined when a player visits the casino. For example, a "Partial Outcome Redemption" gaming device may be configured to accept partial outcome identifiers from players, validate one or more "head start" sessions based at least on the partial outcome identifiers, and then internally generate complete outcomes for the player. In an implementation, such a gaming device may continually generate complete outcomes internally until a complete outcome occurs that matches the partial outcome, and then that complete game outcome is output. For example, if the player previously obtained a partial game outcome of "Cherry-Cherry" which requires one more symbol (reel icon) to complete the wagering game, then the gaming device continually generates complete game outcomes such as "Orange-Cherry-Bell" and "Cherry-Banana-Bar" until a complete game outcome beginning with the symbols "Cherry-Cherry" is achieved (wherein the first two reels being "Cherry-Cherry" corresponds to a "match" for the partial game outcome). When a complete game outcome beginning with "Cherry-Cherry" is achieved, the gaming device then outputs that complete game output for viewing by the player, and if it is a winning combination provides a benefit (such as a payout) to the player. Such operation may also be performed by a dual mode gaming device. In an implementation, gaming devices that internally generate complete game outcomes and match them to partial game outcomes may use a random number generator that utilizes, for example, a seed value that is not based on the partial game outcome, and may also use a predetermined paytable to determine payouts for winning combinations.

F. Output the Complete Outcome

Outputting an indication of a complete outcome is similar to outputting the partial outcome, except that one or more output components of a gaming device within a casino may be utilized (as opposed to output devices of a remote gaming device). In addition, in some embodiments, a determined partial outcome may be output by such a gaming device before an associated completed outcome is output. For example, if it is determined that a player wants to complete a partial outcome of "Bar-Bar," a set of video reels first depict "Bar-Bar-?" before the third reel is animated to spin and rest on "7," so that a determined complete outcome of "Bar-Bar-7" is output.

In some embodiments, a complete game outcome may be output to and displayed by a mobile device, for example, that is on the grounds of a casino hotel, or otherwise in a legalized gambling jurisdiction. In some implementations, the mobile device may be used to both obtain partial game results in a first location, and then obtain complete game results in another location.

III. Alternate and Additional Embodiments

Further embodiments offering a "Neutral EV" between standard play and partial outcome completion may be utilized. As explained above, the expected value, "EV" is a function of both probability and payout (the EV of a particular result is the probability of achieving the result multiplied by its payout amount). Therefore, the above-described "Neutral EV" embodiments may focus on manners of adjusting probability alone when players present partial outcomes, and/or keeping payout values constant, so that players may feel an online program "offers more value" if players have a chance to win the same payout amounts offered by casino gaming devices in standard play. However, this needn't necessarily be the case. If it is desired to provide players with a neutral EV between standard play and partial outcome completion, then the probability and/or payout amounts may be adjusted.

For example, consider FIG. 4A illustrating the "Big Jackpot Slot Machine" standard play paytable 410 and partial outcome paytable 450. In this example embodiment, a player achieving a partial outcome of "Jackpot-Jackpot" when playing online is shown the "Jackpot-Jackpot Completion Paytable" 600 of FIG. 6A when visiting the casino to complete the partial outcome. Referring to FIG. 6A, the "Big Jackpot Slot Machine" (GD-000001) 602 is associated with a "Jackpot-Jackpot Completion Paytable: PT-000003" 604. Referring to the standard paytable 425 of FIG. 4A and the partial outcome paytable 600 of FIG. 6A, when compared to a standard player, the player completing a partial outcome of "Jackpot-Jackpot" has (i) a greater probability of achieving "Jackpot-Jackpot-Jackpot," and also (ii) a greater probability of achieving a non-winning result. But the payout for "Jackpot-Jackpot-Jackpot" remains constant at 1000 coins in each case. The fact that the player has a much greater overall probability of achieving a losing result is what allows for the provision of the same payout amount and greater probability for "Jackpot-Jackpot-Jackpot."

However, other methods of providing the same overall EV (0.9625) are contemplated. For example, when compared to a standard player (the "standard play paytable" 410 of FIG. 4A), a completion paytable may be constructed such that a player redeeming a partial outcome of "Jackpot-Jackpot" may be awarded with a lower payout (e.g., 500 coins instead of 1000 coins) at a greater probability (e.g., 0.001925 instead of 0.0009625), such that the same EV is provided (e.g., 0.9625). In another embodiment, a player redeeming a partial outcome of "Jackpot-Jackpot" may be awarded with a greater payout (e.g., 1500 coins instead of 1000 coins) at a lower probability (e.g., 0.000641667 instead of 0.0009625), such that the same EV is provided (e.g., 0.9625). In addition, if a larger pool of potential winning outcomes is available (e.g., "Bar-Bar" is presented instead of "Jackpot-Jackpot"), probabilities and/or payouts associated with more than one complete outcome may be adjusted accordingly within a completion paytable.

In some embodiments, the positioning of gaming devices within a casino, and/or directing players to specific gaming devices to complete partial outcomes, may be important and/or desirable. For example, in some embodiments, it may be desirable to "steer" players towards one or more particular areas and/or devices to complete partial outcomes. In some embodiments, partial outcomes may only be redeemable at certain gaming devices on the floor (e.g., restricted to devices of a particular type, within a particular area, etc.). In some embodiments, whether or not a gaming device is eligible for redemption of partial outcomes may be determined dynamically (e.g., based on a periodic and/or ongoing evaluation of stored rules). Eligible gaming devices may be based on various considerations, including, but not limited to, the time of day and/or the day of the week, the utilization and/or performance metrics associated with one or more devices (e.g., only devices that haven't generated sufficient coin-in or other play activity are eligible for partial outcome redemption). In some embodiments, a gaming device that facilitates both standard play and partial outcome completion may be operable to dynamically "turn off" its ability to facilitate partial outcome completion. In such cases, a "Complete your partial outcome" option may no longer be selectable, and/or images or icons or the functionality of the gaming device to resolve or determine partial outcomes may be "ghosted out" or "grayed out" in a display or graphical user interface (GUI) for use by the player.

In some embodiments, the timing and/or availability for determining partial outcomes may be linked to a vacation that a player has booked. For example, a player may be eligible for getting ⅓ of the outcome 2 weeks from leaving for the vacation, and the next ⅓ one week before the trip, and then complete the partial outcome during the trip. In some embodiments, a player may be restricted from participating online unless that player has booked a room in the casino hotel, and/or signed up for a player tracking card.

It is also contemplated that, in some embodiments, gaming devices within a casino may be used for the entire process. For example, a single gaming device within a casino determines partial results, and then complete the results based on the partial results. For example, the reels of a slot machine may occasionally spin and not completely resolve (e.g., first two reels spin and third does not). Players might be able to "store" these spins and complete them later (e.g., in a bonus round). In another embodiment, one or more gaming devices within a casino determine partial results, and one or more other gaming devices in another physical location within the casino determine the complete results based on the partial results. For example, players might occasionally get "incomplete"

results, and to obtain complete results the player must visit one or more separate machines. For example, a large "Giant Third Reel" machine may provide complete outcomes based on partial outcomes in an exciting manner (e.g., an oversized wheel spins to determine a "third symbol" associated with a partial outcome in a manner similar to the spinning reel made famous by the television show "The Price Is Right™", except that the big wheel in such a case includes symbols on its face that complete one or more partial outcomes that a player previously achieved).

Rules of Interpretation

Numerous embodiments are described in this disclosure, and are presented for illustrative purposes only. The described embodiments are not, and are not intended to be, limiting in any sense. The presently disclosed method(s) are widely applicable to numerous embodiments, as is readily apparent from the disclosure. One of ordinary skill in the art will recognize that the disclosed process(es) may be practiced with various modifications and alterations, such as structural, logical, software, and electrical modifications. Although particular features may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

A player "wagers" at least a single "unit of wager" to pay for a game start. In many gaming devices, a unit of wager may be referred to as a credit. Many gaming devices allow multiple credits to be wagered concurrently in exchange for an improved paytable or more paylines. A unit of wager may be equivalent to a full dollar amount ($1, $5), a fractional dollar amount, a coin (e.g., $0.05 (nickel) or $0.25 (quarter)), or specified amount of another currency (e.g., a specified number of comp points). Some paytables may be expressed as a number of coins won relative to a number of coins wagered. In such instances, the term coin is the same as a unit of wager. Because gaming devices are embodied in different denominations, it is relevant to note that a coin, credit, or unit of wager on a first device may not be identically valued as a coin, credit, or unit of wager on a second device. For example, a credit on a quarter slot machine (on which the credit is equivalent to $0.25) is not the same as a credit on a five dollar slot machine (on which the credit is equivalent to $5.00). Accordingly, it should be understood that in embodiments in which a player may cash out credits from a first gaming device that operates based on a first denomination (e.g., a quarter-play slot machine) and establish, using only the cashed out credits, a credit balance on a second gaming device that operates based on a second denomination (e.g., a nickel-play slot machine), the player may receive a different number of credits on the second gaming device than the number of credits cashed out at the first gaming device. An interesting discussion of this concept can be found in U.S. Pat. No. 5,277,424, which is hereby incorporated by reference in its entirety. "Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, TDMA, CDMA, GSM, EDGE, GPRS, WCDMA, AMPS, D-AMPS, IEEE 802.11 (WI-FI), IEEE 802.3, SAP, SAS™ by IGT, OASIS™ by Aristocrat Technologies, SDS by Bally Gaming and Systems, ATP, TCP/IP, gaming device standard (GDS) published by the Gaming Standards Association of Fremont, Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE INC, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

The invention is claimed as follows:

1. A gaming system server comprising:
   at least one processor; and
   at least one memory device which stores a plurality of instructions which, when executed by the at least one processor, cause the at least one processor to:
   (a) during a first period of time:
      (i) receive data associated with an input at a first gaming device to initiate a play of a game,
      (ii) determine a partial game outcome for the initiated play of the game, said determined partial game outcome not being associated with any monetary award during the first period of time, and
      (iii) cause the first gaming device to display the determined partial game outcome; and
   (b) during a second, subsequent period of time:
      (i) receive data associated with an input at a second, different gaming device to request a completion of the determined partial game outcome for the initiated play of the game,
      (ii) determine a complete game outcome for the initiated play of the game, said determined complete game outcome based, at least in part, on the determined partial game outcome for the initiated play of the game,
      (iii) cause the second gaming device to display the determined complete game outcome,
      (iv) determine any monetary awards associated with the determined complete game outcome, wherein:
         (A) a credit balance is increasable based on any determined monetary awards associated with the determined complete game outcome,
         (B) said credit balance is increasable via an acceptor of a physical item associated with a monetary value, and (C) said credit balance is decreasable via a cashout device configured to receive an input to cause an initiation of a payout associated with the credit balance, and
    (v) cause the second gaming device to display any determined monetary awards associated with the determined complete game outcome.

2. The gaming system server of claim 1, wherein the first gaming device is configured to communicate with the at least one processor through an internet.

3. The gaming system server of claim 1, wherein the first gaming device includes a cellular phone.

4. The gaming system server of claim 1, wherein the generation of the partial game outcome occurs in association with an online casino.

5. The gaming system server of claim 1, wherein independent of the determined partial game outcome and independent of the determined complete game outcome, during the first period of time, the initiated play of the game is a wagering game associated with non-monetary credits and during the second period of time, the initiated play of the game is a wagering game associated with monetary credits.

6. The gaming system server of claim 1, wherein when executed by the at least one processor, the plurality of instructions cause the at least one processor to determine eligibility to complete the determined partial game outcome and if an ineligible determination occurs, not determine any complete game outcomes for the initiated play of the game and not cause the second display device to display any determined complete game outcomes.

7. The gaming system server of claim 1, wherein at least one of the determined complete game outcome for the initiated play of the game and any determined monetary awards associated with the determined complete game outcome are determined in association with the second gaming device.

8. A gaming system server comprising:
    at least one processor; and
    at least one memory device which stores a plurality of instructions which, when executed by the at least one processor, cause the at least one processor to:
        (a) receive data associated with an input of a completion request from a player operating a gaming device to complete at least one partial game outcome that was previously determined for the player, wherein the at least one partial game outcome was obtained by the player through use of a first device different than the gaming device and when the at least one partial game outcome was previously determined, the at least one partial game outcome was not associated with any monetary award,
        (b) determine that the player is entitled to at least one complete game outcome associated with a monetary award,
        (c) cause the gaming device to display the at least one partial game outcome,
        (d) determine, based at least in part on the at least one partial game outcome, at least one complete game outcome,
        (e) cause the gaming device to display the determined at least one complete game outcome, and
        (f) cause the gaming device to display the monetary award associated with the determined at least one complete game outcome, wherein:
            (i) a credit balance is increasable based on the monetary award associated with the determined at least one complete game outcome,
            (ii) said credit balance is increasable via an acceptor of a physical item associated with a monetary value, and
            (iii) said credit balance is decreasable via a cashout device configured to receive an input to cause an initiation of a payout associated with the credit balance.

9. The gaming system server of claim 8, wherein the first device is configured to communicate with the at least one processor through an internet.

10. The gaming system server of claim 8, wherein the first device includes a cellular phone.

11. The gaming system server of claim 8, wherein the generation of the partial game outcome occurs in association with an online casino.

12. A gaming system server comprising:
    at least one processor; and
    at least one memory device which stores a plurality of instructions which, when executed by the at least one processor, cause the at least one processor to:
        (a) during a first period of time:
            (i) receive data associated with an input to initiate a play of a game at a first gaming device, said first gaming device being located remote from any gaming establishment,
            (ii) determine a partial game outcome for the initiated play of the game, and
            (iii) cause the first gaming device to display the determined partial game outcome; and
        (b) during a second, subsequent period of time:
            (i) receive data associated with an input at a second, different gaming device to request a completion of the generated partial game outcome for the initiated play of the game,
            (ii) determine a complete game outcome for the initiated play of the game, said determined complete game outcome based, at least in part, on the determined partial game outcome for the initiated play of the game,
            (iii) cause the second gaming device to display the determined complete game outcome,
            (iv) determine any awards associated with the determined complete game outcome, wherein:
                (A) a credit balance is increasable based on any determined awards associated with the determined complete game outcome,
                (B) said credit balance is increasable via an acceptor of a physical item associated with a monetary value, and
                (C) said credit balance is decreasable via a cashout device configured to receive an input to cause an initiation of a payout associated with the credit balance, and
            (v) cause the second gaming device to display any determined awards associated with the determined complete game outcome.

13. The gaming system server of claim 12, wherein the second gaming device is located at a gaming establishment.

14. The gaming system server of claim 12, wherein the first gaming device is configured to communicate with the at least one processor through an internet.

15. The gaming system server of claim 12, wherein the first gaming device includes a cellular phone.

16. The gaming system server of claim 12, wherein the determination of the partial game outcome occurs in association with an online casino.

17. The gaming system server of claim 12, wherein independent of the determined partial game outcome and independent of the determined complete game outcome, during the first period of time, no monetary awards are associated with the initiated play of the game and during the second period of time, at least one monetary award is associated with the initiated play of the game.

18. The gaming system server of claim 12, wherein independent of the determined partial game outcome and independent of the determined complete game outcome, during the first period of time, the initiated play of the game is a wagering game associated with non-monetary credits and during the second period of time, the initiated play of the game is a wagering game associated with monetary credits.

19. The gaming system server of claim 12, wherein when executed by the at least one processor, the plurality of instructions cause the at least one processor to determine eligibility to complete the determined partial game outcome and if an ineligible determination occurs, not determined any complete game outcomes for the initiated play of the game and not cause the second display device to display any determined complete game outcomes.

20. The gaming system server of claim 12, wherein at least one of the determined complete game outcome for the initiated play of the game and any determined awards associated with the determined complete game outcome are determined in association with the second gaming device.

* * * * *